United States Patent [19]

Nishimura et al.

[11] Patent Number: 4,933,221

[45] Date of Patent: Jun. 12, 1990

[54] OPTICAL RECORDING DEVICE

[75] Inventors: Yukuo Nishimura, Sagamihara; Haruki Kawada, Kawasaki; Masahiro Haruta, Funabashi; Yutaka Hirai, Tokyo; Noritaka Mochizuki, Yokohama; Takashi Nakagiri, Tokyo, all of Japan

[73] Assignee: Canon Kabushiki Kaisha, Tokyo, Japan

[21] Appl. No.: 233,902

[22] Filed: Aug. 17, 1988

Related U.S. Application Data

[63] Continuation of Ser. No. 759,968, Jul. 29, 1985, abandoned.

[30] Foreign Application Priority Data

| Jul. 31, 1984 | [JP] | Japan | 59-159101 |
| Jul. 31, 1984 | [JP] | Japan | 59-159102 |
| Jul. 31, 1984 | [JP] | Japan | 59-159103 |
| Jul. 31, 1984 | [JP] | Japan | 59-159104 |
| Jul. 31, 1984 | [JP] | Japan | 59-159105 |
| Jul. 31, 1984 | [JP] | Japan | 59-159106 |
| Jul. 31, 1984 | [JP] | Japan | 59-159107 |
| Jul. 31, 1984 | [JP] | Japan | 59-159108 |
| Jul. 31, 1984 | [JP] | Japan | 59-159109 |
| Jul. 31, 1984 | [JP] | Japan | 59-159110 |
| Jul. 31, 1984 | [JP] | Japan | 59-159111 |
| Jul. 31, 1984 | [JP] | Japan | 59-159112 |
| Jul. 31, 1984 | [JP] | Japan | 59-159113 |
| Jul. 31, 1984 | [JP] | Japan | 59-159114 |
| Jul. 31, 1984 | [JP] | Japan | 59-159115 |
| Jul. 31, 1984 | [JP] | Japan | 59-159116 |
| Jul. 31, 1984 | [JP] | Japan | 59-159117 |

[51] Int. Cl.$^5$ .................................................. B32B 3/02
[52] U.S. Cl. ........................................ 428/64; 428/65; 428/913; 428/216; 428/411.1; 430/945; 346/76 L; 346/135.1; 369/288; 427/434.3
[58] Field of Search .............. 428/64, 65, 913, 216, 428/411.1; 430/940; 346/135.1, 762; 369/281; 427/434.3

[56] References Cited

U.S. PATENT DOCUMENTS

| 4,375,492 | 3/1983 | Fox | 428/212 |
| 4,510,512 | 4/1985 | Okamoto et al. | 430/945 |
| 4,529,992 | 7/1985 | Ishida et al. | 430/945 |
| 4,585,722 | 4/1986 | Morinaka et al. | 430/200 |
| 4,596,747 | 6/1986 | Nishimatsu et al. | 427/131 |
| 4,686,169 | 8/1987 | Yoshino et al. | 430/940 |
| 4,693,915 | 9/1987 | Matsuda et al. | 428/209 |
| 4,728,576 | 3/1988 | Gillberg-LaForce et al. | 428/911.1 |
| 4,737,427 | 4/1988 | Miyazcki et al. | 430/19 |
| 4,753,830 | 6/1988 | Matsuda et al. | 427/150 |
| 4,766,047 | 8/1988 | Matsuda et al. | 430/19 |
| 4,782,006 | 11/1988 | Nishimura et al. | 430/292 |
| 4,801,420 | 1/1989 | Uekita | 427/434.3 |

FOREIGN PATENT DOCUMENTS

| 0182485 | 11/1982 | Japan | 346/135.1 |
| 0154098 | 8/1985 | Japan | 430/945 |

OTHER PUBLICATIONS

Nikkei Industrial Newspaper, dated Oct. 18, 1983 and translation.

Primary Examiner—Patrick Ryan
Attorney, Agent, or Firm—Fitzpatrick, Cella, Harper & Scinto

[57] ABSTRACT

An optical recording device and an information memorizing device utilizing the same are provided. The optical recording device comprises an A-layer comprising a chromogenic compound which is usually colorless or pale colored, a B-layer comprising an auxochromic compound capable of making said chromogenic compound form color through contact with said chromogenic compound, and a light-absorbing layer, at least one of the three layers being constituted of a monomolecular film or a built-up film thereof.

31 Claims, 4 Drawing Sheets

OPTICAL RECORDING DEVICE

This application is a continuation of application Ser. No. 759,968 filed July 29, 1985, now abandoned.

BACKGROUND OF THE INVENTION

1. Field of the Invention

This invention relates to an optical recording device utilizing an organic material, particularly an optical recording device capable of recording with high reliability and high density utilizing an organic thin film of a high degree of molecular orientation, and to an information memorizing device utilizing said optical recording device.

2. Description of the Prior Art

Recently an optical disc is highlighted as the central recording (memorizing) device in office automation (OA). This is because a large amount of documents and literature can be recorded (or memoried) with only one sheet of optical disc, and therefore introduction of an information memorizing device using said optical disc is expected to bring about a great revolution in arrangement and management of documents and literatures in offices. Also, as the recording material for said optical disc, organic materials having specific features of low cost, easy fabricability, high density recordability, etc. are attracting attention.

Among the prior arts employing such organic recording materials, an optical recording device of a binary component system utilizing particularly a color forming reaction through contact of chromogenic agent with an auxochromic agent capable of developing said chromogenic agent form color (hereinafter referred to as "an assistant agent" or "an assistant compound" has been reported (Nikkei Industrial Newspaper, Oct. 18, 1983).

To describe an example of said optical recording device by referring to a drawing, as shown in FIG. 2(a), it consists of a chromogenic agent layer 7 and an assistant agent layer 5 laminated on a substrate 1 separated from each other through a light-absorbing layer 6.

The chromogenic agent (leuco form) and the assistant agent themselves are colorless or pale colored before they contact with each other.

When recording is made on said recording device, by irradiation of a laser beam 8 at a desired position on the light-absorbing layer as shown in FIG. 2(b), the portion irradiated by a laser beam in the light-absorbing layer is melted by absorption of the laser beam to be broken with formation of a small pit.

Consequently, the chromogenic agent and the assistant agent separated through the light-absorbing layer 6 are mixed together as shown in FIG. 2(c) to develop color. The information is recorded or memoried in the form of the color point 9, and reading is performed by scanning on said recording device with another light source and detecting the change in reflectance, transmittance, etc. by the color formed point.

SUMMARY OF THE INVENTION

In the above optical recording device as described above, for the purpose of making the density of recording higher, the light-absorbing layer 6 is desired to be as thin as possible, flat and free from layer thickness irregularity. However, in the optical recording device of the prior art, the light-absorbing layer is provided on a substrate according to, for example, the vacuum vapor deposition method or the roller coating method. Therefore, when the light-absorbing layer is made to be 200 to 500 Å thick or less, pinholes are liable to emerge in large numbers, and these two components (a chromogenic agent and an assistant agent) will undesirably contact with each other through the pinholes to form color, so that optical recording devices of prior arts have a drawback of lack of recording reliability. Further, since the constituting molecules are not oriented in each layer formed by the conventional coating methods as described above, light will be scattered in a layer at light-irradiation. Thus microscopically, chemical reactions taking place in each light irradiation will vary in the reaction degree. Further, when a larger area of an optical disc substrate is used according to the above-mentioned coating methods, the coated layer will be irregular in layer thickness. Accordingly, a conventional optical recording device also has a defect that, for example, recording quality is irregular.

Therefore, it is desired that the distribution and orientation of molecules in the layer are regular in an optical recording device, and the layer be free from pinholes and thickness irregularity. Furthermore, it is required that the layer thickness is as thin as possible. In the above-mentioned requirement, the present invention has been achieved to satisfy the above-mentioned requirements.

An object of the present invention is to provide an optical recording device capable of recording with high reliability and high density.

Another object of the present invention is to provide an optical recording device which can be manufactured easily and at low cost. A further object of the present invention is to provide an optical recording device of large area.

The above objects of the present invention have been accomplished by employing specific materials and forming them to a specific constitution.

According to one aspect of the present invention, there is provided an optical recording device, comprising an A layer comprising a chromogenic compound which is usually colorless or pale colored, a B layer comprising an assistant compound capable of forming color in contact with said chromogenic compound, and a light-absorbing layer, at least one of the three layers being constituted of a monomolecular film or a built-up film thereof.

According to another aspect of the present invention, there is provided an optical recording device, comprising an A layer comprising a chromogenic compound which is usually colorless or pale colored, a light-absorbing layer and a B layer comprising an assistant compound capable of forming color in contact with said chromogenic compound, said three layers being laminated in this order and at least one of said three layers being constituted of a monomolecular film or a built-up film thereof.

According to further aspect of the present invention, there is provided an optical recording device, comprising a light-absorbing layer, an A layer comprising a chromogenic compound which is usually colorless or pale colored and a B layer comprising an assistant compound capable of forming color in contact with said chromogenic compound, said three layers being laminated in this order and at least one of said three layers being constituted of a monomolecular film or a built-up film thereof.

According to the still another aspect of the present invention, there is provided an optical recording device, comprising an A layer comprising a chromogenic compound which is usually colorless or pale colored and a B layer comprising an assistant compound capable of forming color in contact with said chromogenic compound and a light-absorbing layer, said three layers being laminated in this order and at least one of said three layers being constituted of a monomolecular film or a built-up film thereof.

According to the still further aspect of the present invention, there is provided an information memorizing device, comprising a writing means comprising a controlling circuit and an optical pick up system, a reading means comprising an output circuit, and an optical recording device, wherein said optical recording device comprises an A layer comprising a chromogenic compound which is usually colorless or pale colored, a B layer comprising an assistant compound capable of forming color in contact with said chromogenic compound, and a light-absorbing layer, at least one of the three layers being constituted of a monomolecular film or a built-up film thereof.

DESCRIPTION OF THE PREFERRED EMBODIMENTS

Figure 1A:
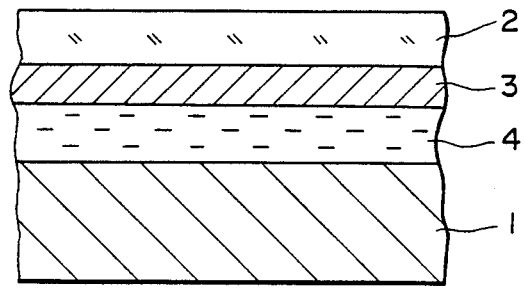
FIGS. 1 (a), (b) and (c) are schematic sectional views of an embodiment of the optical recording device according to the present invention.

The optical recording device according to the present invention is constituted of an A layer comprising a chromogenic compound which is usually colorless or pale colored, a B layer comprising an assistant compound which makes said chromogenic compound form color in contact with said chromogenic compound and a light-absorbing layer, and it is basically required to use a combination of substance for said A layer and B layer which can form a color through contact or mixing with each other.

Also, the optical recording device according to the present invention is constituted of an A layer comprising a chromogenic compound which is usually colorless or pale colored, a B layer comprising an assistant compound which makes said chromogenic compound form color in contact with said chromogenic compound and a light-absorbing layer interposed between said A layer and said B layer, and it is basically required to use a combination of substances for said A layer and B layer which can form a color in contact or mixing with each other.

Further, the optical recording device according to the present invention is constituted of an A layer comprising a chromogenic compound which is usually colorless or pale colored, a B layer comprising an assistant compound which makes said chromogenic compound from color in contact with said chromogenic compound laminated on said A layer, and further having a light-absorbing layer provided on the A layer or the B layer, and it is basically required to use a combination of substances for said A layer and B layer which can form a color in contact or mixing with each other.

Examples of the combination of the chromogenic compound of the A layer which is usually colorless or pale colored and the assistant compound which makes said chromogenic compound form color in contact with said chromogenic compound are shown below:

(1) an acidic substance (B layer) and a leuco form of a dye (dye precursor) which forms color in contact with said acidic substance;

(2) an oxidizing agent (B layer) and a leuco form of a dye which forms color in contact with said oxidizing agent;

(3) a reducing agent (B layer) and a leuco form of a dye which forms color in contact with said reducing agent;

(4) a reducing agent (B layer) and an oxidizing agent (A layer) which forms color when reduced, such as ferric stearate;

(5) an oxidizing agent (B layer) and a reducing agent (A layer) which forms a color when oxidized, such as gallic acid.

To describe in detail about examples of the above case (1), the acidic substances of the B layer which can react and make the leuco form of a dye form color through contact with the leuco form of a dye may include aromatic sulfonic acid compounds such as benzenesulfonic acid, etc., aromatic carboxylic acids such as benzoic acid, etc., higher aliphatic carboxylic acids such as palmitic acid ($C_{15}H_{31}COOH$), stearic acid ($C_{17}H_{35}COOH$), arachidic acid ($C_{19}H_{39}COOH$), etc., phenolic compounds such as p-t-butylphenol, α-naphthol, β-naphthol, phenolphthalein, bisphenol A, p-phenoxyphenol, 4-hydroxyacetophenone etc.

The leuco forms of dyes in the A layer reactive through contact with said acidic substance may include, for example, triphenylmethane type, fluorane type, phenothiazine type, auramine type, spiropyrane type, etc. and typical examples included in such types of compounds are detailed in Table 1.

TABLE 1

| | Color forming temperature | Color formed |
|---|---|---|
| Triphenylmethane type: | | |
| Crystal violet lactone | 175–180° C. | Violet |
| 4-Hydroxy-4'-dimethylaminotriphenylmethane lactone | 120–123° C. | Red |
| 4,4-Bisdihydroxy-3,3'-bisdiaminotriphenylmethane lactone | 163° C. | Bluish violet |
| Fluorane type: | | |
| 3-Diethylamino-6-methyl-7-chlorofluorane | 200–210° C. | Vermilion |
| 3,7-Bisdiethylaminofluorane | 172–174° C. | Dark green |
| 3-Diethylamino-7-methoxyfluorane | 123–125° C. | Reddish pink |
| 3-Diethylamino-6-phenylaminofluorane | 220–230° C. | Orange yellow |
| Auramine type: | | |
| 4,4'-Bisdimethylamino-3,4-chlorophenylleucoauramine | 140° C. | Violet blue |
| 4,4'-Bisdimethylaminopiperazine hydrol | 150° C. | Violet blue |
| Phenothiazone type: | | |
| p-Methoxybenzoylleucomethylene blue | 106–107° C. | Blue |
| Spiropyrane type: | | |

TABLE 1-continued

| | Color forming temperature | Color formed |
|---|---|---|
| 8'-Methoxybenzoidolino-spiropyrane | 123–125° C. | Blue black |
| 3-Phenyl-3'-methoxy-benzoindolinospiropyrane | 105–109° C. | Dark blue |
| 6'-Chloro-8'-methoxybenzoindolino-spiropyrane | 123–125° C. | Greenish blue |
| 5,6'-Dichloro-8'-methoxybenzoindolino-spiropyrane | 149–152° C. | Green |
| 4,7,8'-trimethoxy-benzoindolino-spiropyrane | 104–106° C. | Violet scarlet |

The optical recording device in another embodiment according to the present invention utilizes color forming reaction of a binary component system, more specifically a color forming reaction between a leuco form of a dye and a phenolic compound which effects color formation through contact with the leuco form of said dye.

Thus, the optical recording device according to the present invention may also be constituted basically of an A layer comprising a leuco form of a dye which is usually colorless or pale colored, a B layer which is capable of making the leuco form of said dye form color in contact with the leuco form of said dye and a light-absorbing layer which generates heat by absorption of light to melt or sublime.

The leuco form of a dye to be used in the A layer which is usually colorless or pale colored may be the same as described above.

Next, as the phenolic compound in the B layer capable of forming color in contact with the leuco form of dye, there may be included, for example, in addition to the phenolic compounds as mentioned above, 3,5-xylenol, thymol, hydroquinone, methyl-4-hydroxybenzoate, catechol, resorcinol, 4-tertoctylcatechol, 4,4'-sec-butylidenediphenol, 2,2'-dihydroxydiphenyl, 2,2'-methylene-bis(4-methyl-6-tert-butylphenol), 2,2'-bis(4'-hydroxyphenyl)propane, 4,4'-isopropylidene-bis-(2-tert-butylphenol), pyrogallol, phloroglucinol, phloroglucinol carboxylic acid, etc.

As the light-absorbing substance to be used in formation of the light-absorbing layer in the present invention, there may preferably be employed a meltable light-absorbing dye which melts by absorption of infrared ray or a sublimable light-absorbing dye which is sublimed by absorption of infrared ray.

Examples of such a light-absorbing dye may be metal phthalocyanines such as copper phthalocyanine, vanadium phthalocyanine, etc., xanthene dyes such as fluorescein, etc.

In the present invention, since at least one layer of the A layer, the B layer and the light-absorbing layer is formed of a monomolecular layer or a built-up film thereof, the aforesaid chromogenic compound, the assistant compound and the light-absorbing substance are required to be derivatives in which hydrophilic group, hydrophobic group or both are introduced at appropriate sites in the molecule, when they are to be used for formation of a monomolecular film or a built-up film thereof.

The hydrophobic group and the hydrophilic group may be any of those generally employed, particularly preferably a hydrophobic group of a long chain alkyl group having 5 to 30 carbon atoms and a hydrophilic group of a carboxyl group or its metal salt (e.g. cadmium salt).

In the present invention, films not formed of a monomolecular film or a built-up film thereof, may be any film which can be formed according to any of the film forming methods of the prior arts. Among them, layers comprising deposited films, coated films, dipped films, laminates, etc. are preferred.

The A layer and the B layer should desirably have a film thickness of 200 Å to 10 $\mu$, preferably 1,000 Å to 1 $\mu$, in either the case when they are formed of a monomolecular film or a built-up film thereof or the case in which they are formed according to the film forming method of the prior art.

The light-absorbing layer, when formed of a monomolecular film or a built-up film thereof, should desirably have a film thickness of 30 Å to 1,000 Å, preferably 50 Å to 200 Å, or when formed by the film forming method of the prior art, should desirably have a film thickness of 90 Å to 1,000 Å, preferably 140 Å to 400 Å.

As the material to be used for the substrate in the present invention, there may be employed semiconductor materials such as silicon, etc., metal materials such as aluminum, preferably reinforced glass, more preferably plastic materials such as acrylate (PMMA), polycarbonate (PC), polypropylene, polyvinyl chloride (PVC), polystyrene, etc., and ceramic materials.

As the method for forming monomolecular films or built-up films thereof having such high order and high orientation of molecules, there may be employed, for example, the Langmuir-Blodgett's method (LB method) developed by I. Langmuir et al. The Langmuir-Blodgett's method is a method for preparing a monomolecular film or a built-up film of monomolecules by utilizing the fact that, for example, in molecules with a structure having a hydrophilic group and a hydrophobic group, when the balance between the both groups (balance in amphiphilic property) is adequate, the molecule will form a monomolecular layer with the hydrophilic group directing downward on the water surface. The monomolecular layer on the wafer surface has the characteristics of a two-dimensional system. When the moleculars are spread sparsely, between the area per one molecule and the surface pressure $\pi$, the formula of the two-dimensional ideal gas:

$$\pi = kT$$

is valid, whereby it is called to be a "gaseous film", where k is the Boltzman's constant and T is the absolute temperature. If A is made sufficiently small, the interaction between the molecules will be strengthened to make the film a "condensed film (or solid film)". The condensed film can be transferred one by one layer onto the surface of a carrier of various materials such as plastic substrate or glass substrate having various shapes.

Next, a description is made in detail about the method for forming a monomolecular film or a built-up film thereof of an organic molecule having both hydrophilic and hydrophobic groups, which is the chromogenic compound, the assistant compound or the light-absorbing substance to be used in the present invention.

Figure 3:
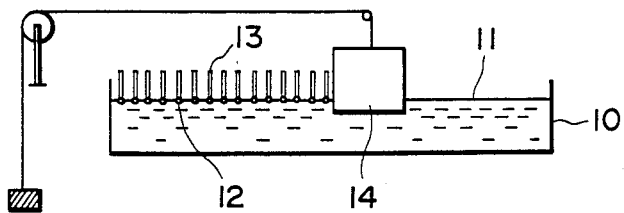
FIG. 3 is a schematic sectional view of a device for forming a monomolecular layer built-up film.

First, said organic molecules are dissolved in a volatile solvent such as benzene, chloroform, etc. and the solution is spread by means of a cylinder, etc. over the aqueous phase 11 in the water vessel 10 in the monomolecular built-up film forming device as shown schematically in FIG. 3.

Said organic molecules will be spread over the aqueous phase 11 with the evaporation of the solvent, with their hydrophilic groups 12 being directed toward the aqueous phase and the hydrophobic groups toward the gas phase.

Then, the spreading area is restricted by providing a partitioning plate (or buoy) 14 so that the molecules to form a film (organic molecules) may not be diffused freely and expanded excessively, thereby controlling the gathered state of the film material to obtain a surface pressure $\pi$ in proportion to the gathered state. By moving the partitioning plate 14 to reduce the spreading area and control the gathered state of the film material, the surface pressure can be gradually elevated to set a surface pressure $\pi$ which is suitable for preparation of the built-up film. With this surface pressure maintained, a clean substrate 14 can be moved downward or upward, whereby the monomolecular film 16 can be transferred onto the substrate. The monomolecular film 16 can be prepared according to the above operation, and the built-up film 17 of monomolecular layers can be formed to have a desired number of layers by repeating the above operation.

For example, when the substrate 15 having a hydrophilic surface is pulled out of the water in the direction to transverse the water surface, a monomolecular layer 16 of the organic molecules with the hydrophilic groups facing toward the substrate 15 side will be formed on the substrate 15. By moving the substrate 15 upward and downward as mentioned above, each one sheet of the monomolecular layer 16 per each step is laminated successively. Since the orientations of the film forming molecules are opposite in the lifting step and the dipping step, according to this method, the so-called Y type film is formed, in which hydrophilic groups confront hydrophilic groups, and hydrophobic groups confront hydrophobic groups in the oragnic molecules between the adjacent layers (see FIG. 4 (a)).

The Y type film is firm, because hydrophilic groups are mutually faced to each other and hydrophobic groups also to each other.

In contrast, there is also a method in which said organic molecules are transferred only during the process where the substrate 15 is dipped into water.

Figure 4A:
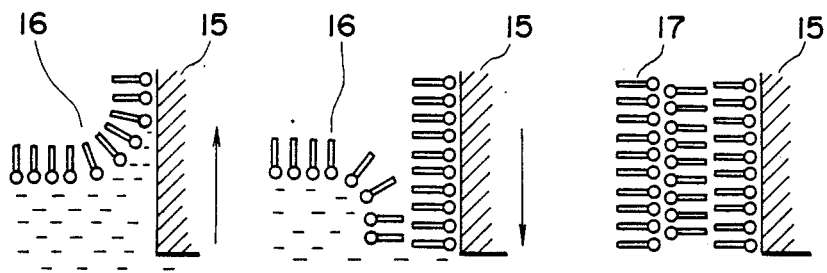
FIGS. 4 (a), (b) and (c) are steps for preparation of a monomolecular layer built-up film.
Figure 4B:
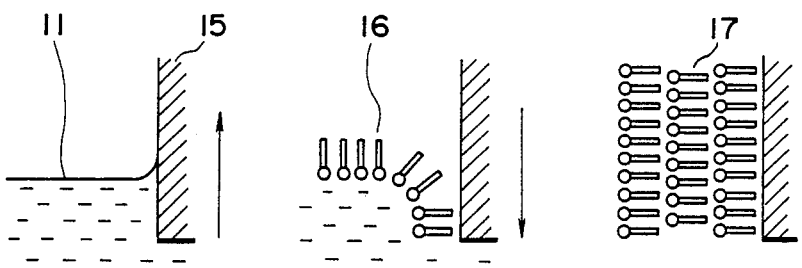
Figure 4C:
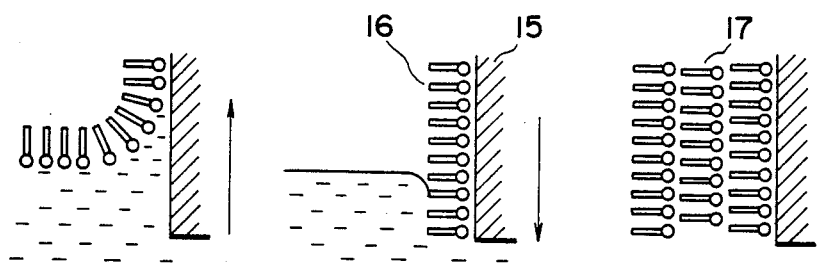

According to this method, even when built up, there is no alteration in orientation of the film forming molecules, and an X type film with the hydrophobic groups facing toward the substrate 15 in all the layers is formed (FIG. 4 (b)). On the contrary, a built-up film in which the hydrophilic groups are faced toward the substrate 15 side is called as the Z type film (FIG. 4 (c)).

The Z type film is obtained by transferring the organic molecules onto the substrate only when the substrate 15 is pulled out of the water.

The monomolecular film and the built-up film of monomolecular layers formed on the substrate according to the method as described above has a high density as well as a high degree of order and orientation, and it is possible to obtain a recording device having a high density capable of optothermal recording and recording performance with high resolution by constituting the recording layer of these films. Also, these film forming methods are very simple, as apparently seen from the principle, and can provide the recording devices having such excellent recording performance as mentioned above at low cost.

The substrate for forming the monomolecular film or a built-up film of monomolecular layers thereof as described above is not particularly limited, but the substrate is required to have a clean surface, because a good monomolecular film or a good built-up film of monomolecular layers cannot be formed due to disturbance of the monomolecular film, if impurities such as surfactants are attached on the substrate surface.

The monomolecular film or a built-up film of monomolecular layers is fixed sufficiently onto the substrate, and exfoliation or peel-off will hardly occur. However, for reinforcement of adhesive force, it is also possible to provide an adhesive layer between the substrate and the monomolecular film or the built-up film of monomolecular layers. Further, adhesive force can further be reinforced by selection of the conditions for forming the monomolecular layer, such as hydrogen ion concentration, ion species, water temperature in the aqueous phase, the speed of moving up and down the substrate or the surface pressure.

Referring next to the case when the A layer, the B layer or the light-absorbing layer is formed as the deposited film, an aqueous mixture containing a binder and water added to said chromogenic compound, said assistant compound or said light-absorbing substance is crushed and mixed by a ball mill, followed by coating according to a conventional manner on a substrate, etc.

The binder to be used in the present invention may be natural polymers such as gelatin, starch, etc., cellulose derivatives such as nitrocellulose, carboxymethyl cellulose, semi-synthetic polymers such as plasticized natural rubber (e.g. chlorinated rubber, cyclized rubber, etc.), polymerization type synthetic polymers such as polyisobutylene, polystyrene, terpene resins, polyacrylic acid, polyacrylate, polymethacrylate, polyacrylonitrile, polyacrylamide, polyvinyl acetate, polyvinyl alcohol, polyvinyl pyrrolidone, polyacetal resin, polyvinyl chloride, polyvinyl pyridine, polyvinyl carbazole, polybutadiene, polystyrene-butadiene, butyl rubber, polyoxymethylene, polyethyleneimine, polyethyleneimine hydrochloride, poly(2-acryloxyethyldimethylsulfonium chloride), etc., polycondensation type synthetic polymers such as phenol resin, amino resin, toluene resin, alkyd resin, unsaturated polyester resin, allyl resin, polycarbonate, polyamide resin, polyether resin, silicon resin, furan resin, thiocol rubber, etc., addition polymerization type resin such as polyurethane, polyurea, epoxy resin, etc.

Referring now to an example according to the optical recording device prepared by the method as described above, as shown in FIG. 1 (a), it comprises an A layer 2 comprising a chromogenic compound, a B layer 4 comprising an assistant compound and a light-absorbing layer 3 comprising a light-absorbing substance interposed between the A layer and the B layer, at least one of the A layer 2, the B layer 4 and the light-absorbing layer 3 being a monomolecular film or its built-up film, or otherwise a laminate of deposited films, said B layer 4 being supported on the substrate and the layers being laminated in the order of substrate/B layer/light-absorbing layer/A layer. For example, the A layer comprises the leuco form of a dye and the B layer comprises a phenolic compound.

Further, as another example, the A layer of the above laminate may be supported on the substrate, and the laminate may be formed in the order of substrate/A layer/light-absorbing layer/B layer, or the above laminate may be piled up two or more stages, with the lowest A layer or B layer being supported on the substrate.

In the optical recording device according to the present invention, which is constituted of the A layer and the B layer separated through the light-absorbing layer from each other, pits can be formed by melting or sublimation of the light-absorbing substance by irradiation of infrared ray at desired positions, whereby the chromogenic compound and the assistant compound contact with each other to proceed a reaction, to effect information recording by forming the colored points at said positions.

To describe about another example of the optical recording device according to the present invention by the method as described above, as shown in FIG. 1 (b), an A layer 2 comprising a chromogenic compound and a B layer 4 comprising an assistant compound are laminated, and further a light-absorbing layer 3 is provided on said B layer 4, all of the layers comprising a monomolecular film or a built-up film thereof, laminated in the order of substrate/light-absorbing layer/B layer/A layer with the light-absorbing layer being supported on the substrate. In this case, the order or lamination may be substrate/light-absorbing layer/A layer/B layer, with the order of the A layer 2 and the B layer 4 being reversed.

Figure 1B:
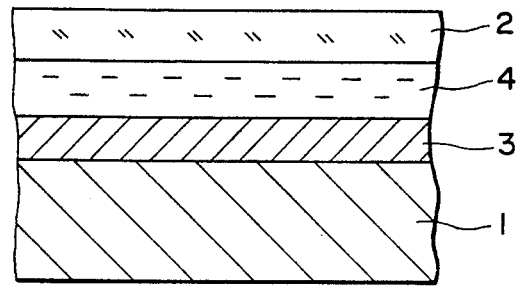
Figure 1C:
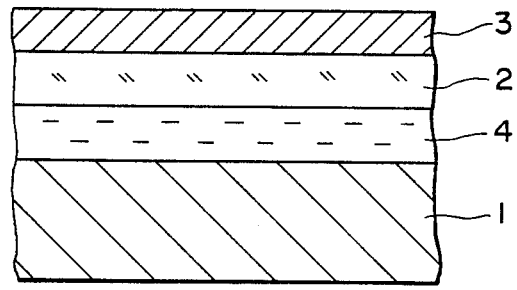
Figure 2A:
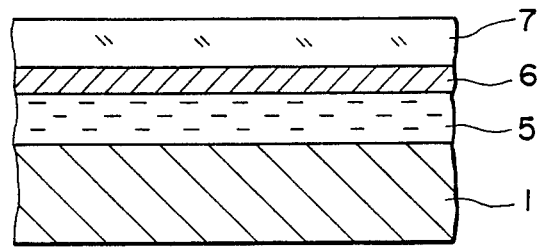
FIGS. 2 (a), (b) and (c) are schematic illustrations of the recording process of the optical recording device of the prior art.
Figure 2B:
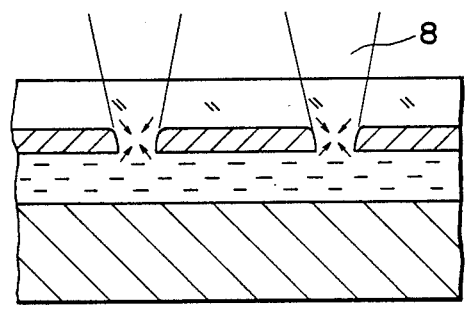
Figure 2C:
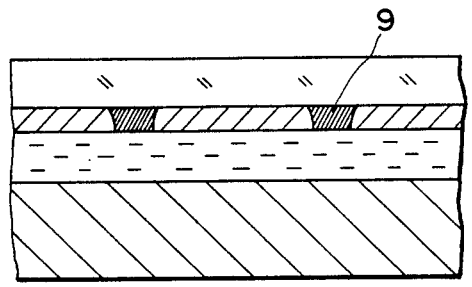

Further, to describe about still another example, as shown in FIG. 1 (c), the A layer 2 and the B layer 4 are laminated, and further the light-absorbing layer 3 is provided on said A layer to form a laminate, with the B layer being supported on the substrate 1, thus forming a laminate in the order of substrate/B layer/A layer/light-absorbing layer. In this case, similarly as described above, the order of the A layer 2 and the B layer may be reversed to form a laminate in the order of substrate/A layer/B layer/light-absorbing layer.

Also, in any of the constitutions shown in FIG. 1 (b) and (c), the laminate as described above may be piled up two or more stages to be supported on the substrate.

The optical recording device according to the present invention is constituted of an A layer comprising a chromogenic compound and a B layer comprising an assistant compound tightly contacted with each other, but it has been believed to be impossible to provide a recording device of such a constitution according to the technique of the prior arts. However, in the present invention, since the A layer and the B layer are formed of a monomolecular film or a built-up film thereof having high degree of order and orientation, the reactive sites can be separated from each other through the unreactive sites in the molecule, whereby it is rendered possible to provide a recording device of such a constitution as described above.

Also, in the optical recording device according to the present invention, the A layer and the B layer are laminated in close contact with each other, further with provision of a light-absorbing layer outside thereof. The light-absorbing layer is heated by infrared ray irradiation and through its thermal conduction, and the reaction between the chromogenic compound in the A layer and the assistant compound in the B layer can proceed by contact under heating to form color points at desired positions, thereby recording information.

Figure 5:
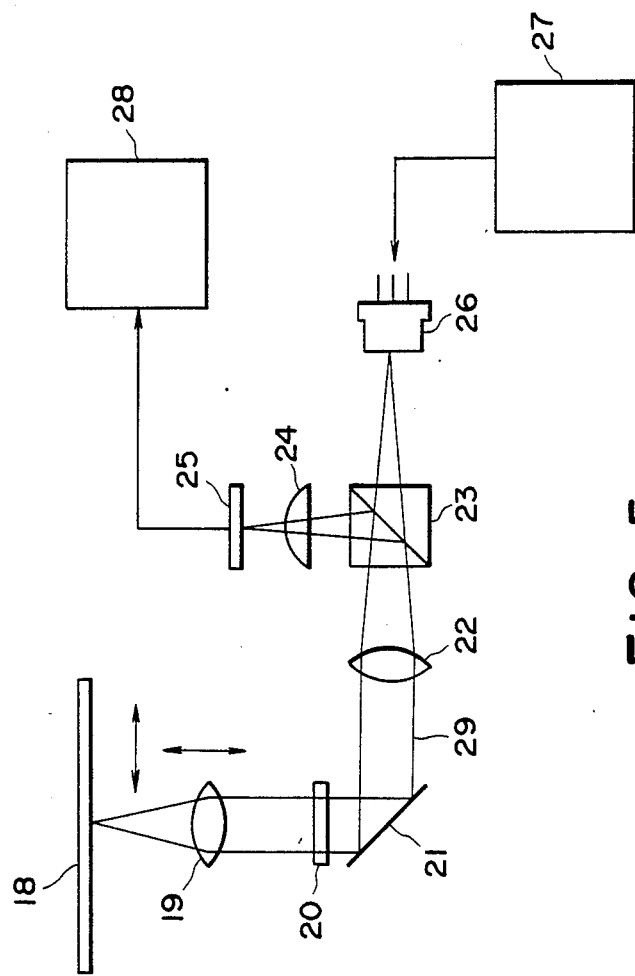
FIG. 5 is a block diagram of an information memorizing device.

Accordingly, the optical recording device of the present invention can be used primarily as an optical disc. An example of an information memorizing device having an optical system of an optical pick-up for writing or reading information into or from said optical disc is shown in FIG. 5. In this Figure, 19 shows an object lens, 20 a ¼ wavelength plate, 21 a reflective mirror, 22 a collimator lens, 23 a polarized beam splitter, and 24 a cylindrical lens.

Said information memorizing device is constituted of a writing means comprising a controlling circuit 27 and an optical pick-up optical system, an optical recording device according to the present invention and a reading means comprising an output circuit 28 and an optical pick-up optical system.

Writing is performed as follows. The controlling circuit 27 controls the oscillation of the semiconductor laser 26. Therefore, the input information is converted to optical signals by the controlling circuit 27 and the semiconductor laser 26. The optical signal 29 passes through the optical pick-up system and forms an image on the recording layer of the optical disc 18 under synchronized rotation to effect recording through color formation according to the color forming mechanism as described above.

Reading is performed as follows. A continuous oscillated light of low output generated from the semiconductor laser 26 is used as the reading light. Since it is of low output, no color forming recording will be effected during reading. Alternatively, another light source for visible light may also be used as the light source for reading.

Said light for reading forms an image on the substrate surface of the optical disc 18 and is reflected thereagainst, and the reflectance differs between the colored point and non-colored point. Therefore, the reflected light can be permitted to enter the light-receiving surface of a photodiode 25 through an optical pick-up system to convert the light into electrical signals to be read for reproduction.

In order to enhance the contrast of such reproduced signals, thereby improving the image quality, etc., it is preferred to provide a metal reflective layer such as of aluminum, etc. on the substrate of the optical recording device.

The metal reflective layer should preferably have a film thickness of 1,000 Å to 2,000 Å. Otherwise, it is also possible to use a dielectric mirror, if desired.

Further, for protection of the A layer, the B layer and the light-absorbing layer, a protective layer may be provided on the outermost surface. Such a protective layer may be made of a material, including dielectric materials such as $SiO_2$, etc., plastic resins and other polymerizable LB films, etc.

As described above, the optical recording device according to the present invention, comprising the A layer, the B layer and the light-absorbing layer, of which at least one layer is constituted of a monomolecular film or its built-up film, has the excellent effects as set forth below:

(1) it has higher signal/noise ratio as compared with the optical recording device employing no monomolecular film or its built-up film of the prior art, whereby reliability of recording can be improved;

(2) physical defects such as pinholes, etc. in the optical recording device can be reduced to a great extent;

(3) recording with higher density as compared with the optical recording device of the prior art is made possible;

(4) the optical recording device can be made to have a larger area.

Also, in the case of the optical recording device having constitutions as shown in FIG. 1(b) and (c), the following effects (5) and (6) may be noted in addition to those as mentioned above:

(5) the absence of intermediary light-absorbing layer between the A layer and the B layer improves color forming efficiency and fidelity;

(6) the absence of intermediary light-absorbing layer between the A layer and the B layer makes thinner the substantial recording layer to enable recording of higher density.

Further, when a deposited layer is used as a part of the layers of the optical recording device of the present invention, further excellent effects (7) and (8) as shown below can be obtained:

(7) when the material excellent as a chromogenic agent having good color forming efficiency, the material excellent as an assistant agent (e.g. phenolic compounds excellent as assistant agents) and the light-absorbing material excellent as the light-absorbing agent can be formed in a monomolecular film or its built-up film with difficulty, or modified chemically (synthesized) to derivatives which can easily form monomolecular film or its built-up film with economical disadvantage, they can be advantageously formed as deposited films (with proviso that all of the three layers are not deposited layers at the same time);

(8) by use of a deposited film as a part of the laminate, there can be obtained such effects that sensitivity can be improved, that preparation can be easy with a broad scope of materials which can be chosen and also the effect in optical property that the difference between the contrast and the noncontrast in reading can clearly be made.

The present invention is described in more detail by referring to the following Examples, in which "parts" represent "parts by weight" and "%" "% by weight" unless otherwise specifically noted. Synthesis example 1 (Synthesis of light-absorbing substance)

Synthesis example of vanadium phthalocyanine derivative

After 10 parts of urea and one part of 10–15% aqueous phosphoric acid were mixed and dissolved, 2 parts of phthalic anhydride, 10 parts of VOCl$_2$ (vanadyl) and 8 parts of a phthalocyanine anhydride derivative of the formula (I):

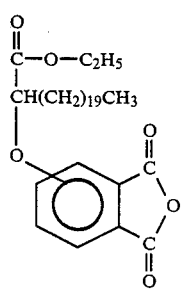

were further added to the solution, and the mixture was heated at 100° C. for 5 hours. After cooling, 100 parts of an aqueous 2% NaOH were added to carry out hydrolysis, followed by separation by chromatography, to obtain 0.1 part of a desired substance (vanadium phthalocyanine derivative) of the formula (II):

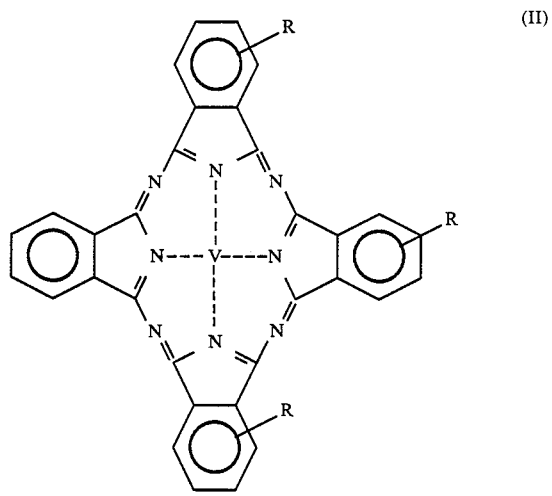

wherein R is:

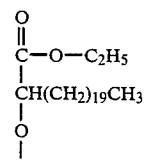

Synthesis example 2 (Synthesis of a chromogenic compound)

Synthesis example of Crystal Violet lactone derivative

One part of a m-aminobenzolic acid derivative of the formula (III):

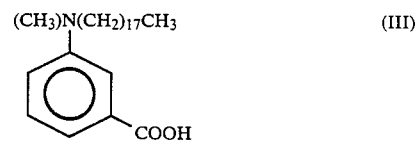

and one part of Michler's hydrol of the formula (IV):

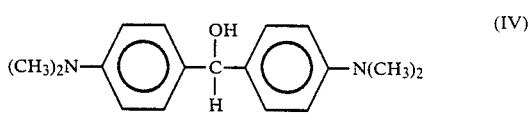

were dissolved in nitrobenzene as a solvent and refluxed with addition of one part of p-toluenesulfonic acid as a catalyst for 8 hours to form a triphenylmethane derivative of the formula (V):

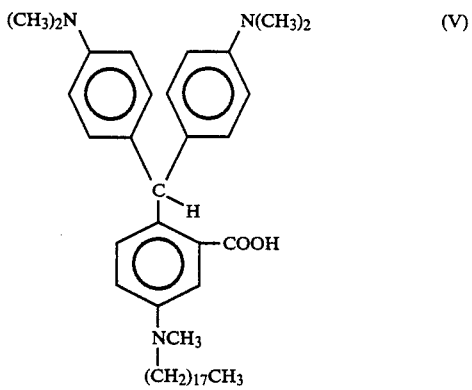

Subsequently, the resulting triphenylmethane derivative was heated in sulfuric acid in the presence of one part of lead dioxide for 3 hours to obtain a Crystal Violet lactone derivative of the formula (VI):

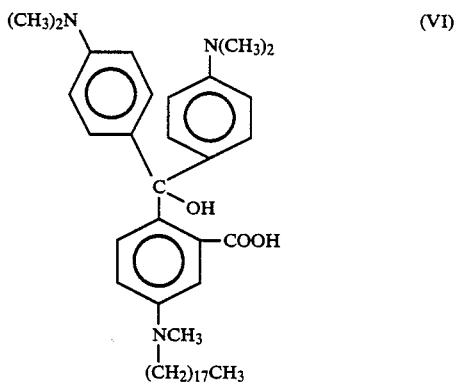

Then, an aqueous sodium hydroxide solution was added to the product to effect cyclization, to obtain 0.2 part of a Crystal Violet lactone derivative of the formula (VII):

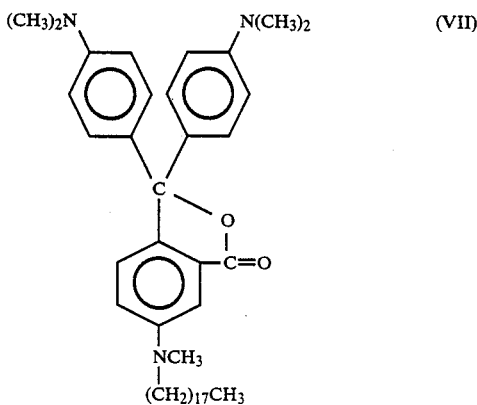

EXAMPLE 1a (1) Method for forming B layer:

A disc substrate of glass of 10 mm in thickness and 180 mm in diameter was thoroughly cleaned. Subsequently, by means of the monomolecular layer forming device as described above, a monomolecular layer built-up film of arachidic acid which is an assistant compound.

The monomolecular layer built-up film of said arachidinic acid was formed according to the method as described below.

After the substrate was immersed in water and was held vertical to the water surface, an arachidic acid solution at a concentration of $2 \times 10^{-3}$ mol/liter in chloroform was added dropwise to spread a monomolecular film on the water surface. With the surface pressure set at 30 dyne/cm, the substrate was moved upward and downward at a speed of 2 cm/min. to prepare a monomolecular built-up film (Y - type film) built up in 27 layers.

Similarly, respective samples of monomolecular built-up films of one layer, 50 layers, 200 layers and 400 layers were obtained.

(2) Method for forming light-absorbing layer:

On the B-layers formed on the glass substrates of respective samples obtained in the above (1), monomolecular built-up films of a vanadium phthalocyanine derivative which is a light-absorbing material were formed by means of the monomolecular layer forming device as described above.

The monomolecular layer built-up film of the vanadium phthalocyanine derivative was formed according to the method as described below.

After the substrate having the B-layer formed thereon was immersed in water and was held vertical to the water surface, a vanadium phthalocyanine derivative solution at a concentration of $2 \times 10^{-3}$ mol/liter in chloroform was added dropwise onto the water surface to spread a monomolecular film on the water surface. With the surface pressure set at 30 dyne/cm, the substrate was moved upward and downward at a speed of 2 cm/min. to form respective samples of monomolecular layer built-up films (Y-type films) having the respective layers built up as shown in Table 2a.

(3) Method for forming A-layer:

As the next step, on the light-absorbing layers on the glass substrates of respective samples obtained in the above (2), monomolecular layer built-up films of a Crystal Violet lactone derivative which is a color forming compound were formed.

The monomolecular layer built-up films of said Crystal Violet lactone derivative were formed according to the method as described below.

After the substrate having the B-layer and the light-absorbing layer formed thereon was immersed in an acidic solution of pH 4 and was held vertical to the water surface, a Crystal Violet lactone derivative solution at a concentration of $2 \times 10^{-3}$ mol/liter in chloroform was added dropwise to spread a monomolecular film on the water surface. With the surface pressure set at 30 dyne/cm, the substrate was moved upward and downward at a speed of 2 cm/min. to form respective samples of monomolecular layer built-up films (Y-type films) having the respective layers built up as shown in Table 2a.

(4) Performance tests:

The optical recording devices of the present invention thus prepared according to the methods as described above and the optical discs having constitutions similar to those of the prior art (the discs were constituted of neither the monomolecular films not the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6-9 mW
Recording frequency: 5 MHz
Rotational number of optical disc: 1,800 rpm Reading under the above conditions was performed at a laser output of 1 mW to determine the signal/noise ratio. The results are shown in Table 2a.

TABLE 2a

| Layer constitution: | Sample no. | | | | | | |
|---|---|---|---|---|---|---|---|
| | 1a | 2a | 3a | 4a | 5a | 6a# | 7a# |
| A-layer (layer number) | 1 | 27 | 50 | 200 | 400 | 0.005 (μ) | 1 (μ) |
| Light-absorbing layer (layer number) | 1 | 2 | 4 | 6 | 8 | 0.005 (μ) | 0.015 (μ) |
| B-layer (layer number) | 1 | 27 | 50 | 200 | 400 | 0.005 (μ) | 1 (μ) |
| Signal/noise ratio (db) | 45 | 60 | 68 | 70 | 65 | 5 | 50 |

Note:
represents Comparative example, and formation of respective layers was performed according to the rotary coating method.

From the results in Table 2, No. 1a (where respective layers consist of monomolecular films) as compared with No. 6a is markedly more excellent in signal/noise ratio. Such a difference in performance between No. 1a and No. 6a having approximately equal film thicknesses, may be considered to come from smaller amount of defects such as pinholes in No. 1a. Similarly, when No. 2a–No. 5a (where respective layers consist of monomolecular layer built-up films) are compared with No. 7a, it can be observed that No. 2a–No. 5a are more excellent in signal/noise ratio than No. 7a.

EXAMPLE 1b (1) Method for forming B-layer:

A disc substrate of glass of 10 mm in thickness and 180 mm in diameter was thoroughly cleaned. Subsequently, 7 parts of arachidic acid which is an assistant compound, 1 part of polyvinyl alcohol as the binder and 40 parts of water were mixed, followed further by milling by a ball mill for several hours. The resultant mixture was applied by rotary coating on the substrates to prepare respective samples having desposited films made of the arachidic acid dispersion in binder (film thickness 1 μ).

(2) Method for forming light-absorbing layer:

On the B-layers formed on the glass substrates of respective samples obtained in the above (1), monomolecular layer built-up films of a vanadium phthalocyanine derivative which is a light-absorbing material were formed by means of the monomolecular layer forming device as described above.

The monomolecular layer built-up film of the vanadium phthalocyanine derivative was formed according to the method as described below.

After the substrate having the B-layer formed thereon was immersed in water in such a manner that the substrate was kept vertical to the water surface, a vanadium phthalocyanine derivative solution at a concentration of $2 \times 10^{-3}$ mol/liter in chloroform was added dropwise onto the water surface to spread a monomolecular film on the water surface. With the surface pressure set at 30 dyne/cm, the substrate was moved upward and downward at a speed of 2 cm/min. to form respective samples of monomolecular layer built-up films (Y-type films) having the respective layers built up as shown in Table 2b.

(3) Method for forming A-layer:

As the next step, on the light-absorbing layers on the glass substrates of respective samples obtained in the above (2), monomolecular layer built-up films of a Crystal Violet lactone derivative which is a color forming compound were formed.

The monomolecular layer built-up films of said Crystal Violet lactone derivative were formed according to the method as described below.

After the substrate having the B-layer and the light-absorbing layer thereon was immersed in an acidic solution of pH 4 and was held vertical to the water surface, a Crystal Violet lactone derivative solution at a concentration of $2 \times 10^{-3}$ mol/liter in chloroform was added dropwise to spread a monomolecular film on the water surface. With the surface pressure set at 30 dyne/cm, the substrate was moved upward and downward at a speed of 2 cm/min. to form respective samples of monomolecular layer built-up films (Y-type films) respective layers built up as shown in Table 2b.

(4) Performance tests:

The optical recording devices of the present invention thus prepared according to the methods as described above and the optical discs having constitutions similar to those of the prior art (the discs were constituted of neither the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6-9 mW
Recording frequency: 5 MHz
Rotational number of optical disc: 1,800 rpm Reading under the above conditions was performed at a laser output of 1 mW to determine the signal/noise ratio. The results are shown in Table 2b.

TABLE 2b

| Layer constitution: | Sample No. | | | | | | |
|---|---|---|---|---|---|---|---|
| | 1b | 2b | 3b | 4b | 5b | 6b# | 7b# |
| A-layer (layer number) | 1 | 27 | 50 | 200 | 400 | 0.005 (μ) | 1 (μ) |
| Light-absorbing layer (layer number) | 1 | 2 | 4 | 6 | 8 | 0.005 (μ) | 0.015 (μ) |
| B-layer (μ) | 1 | 1 | 1 | 1 | 1 | 1 (μ) | 1 (μ) |
| Signal/noise ratio (db) | 45 | 60 | 67 | 70 | 64 | 10 | 50 |

Note
represents Comparative example, and formation of respective layers was performed according to the rotary coating method.

Form the results in Table 2b, No. 1b (where an A layer and a light-absorbing layer consist of monomolecular films) as compared with No. 6b is markedly more excellent in signal/noise ratio. Such difference in performance between No. 1b and No. 6b, although having similar film thicknesses, may be considered to come from smaller amount of defects such as pinholes. Similarly, when No. 2b–No. 5b (when an A layer and a light-absorbing layer consist of monomolecular built-up films) are compared with No. 7b, it can be observed that No. 2b–No. 5b are more excellent in signal/noise ratio than No. 7b.

EXAMPLE 1c (1) Method for forming B-layer:

A disc substrate of glass of 10 mm in thickness and 180 mm in diameter was thoroughly cleaned. Subsequently, by means of the monomolecular layer forming device as described above, a monomolecular layer built-up layer of arachidic acid which is an assistant compound.

The monomolecular layer built-up film of said arachidic acid was formed according to the method as described below.

After the substrate was immersed in water and was kept vertical to the water surface, an arachidic acid solution at a concentration of $2 \times 10^{-3}$ mol/liter in chloroform was added dropwise to spread a monomolecular film on the water surface. With the surface pressure set at 30 dyne/cm, the substrate was moved upward and downward at a speed of 2 cm/min. to prepare a monomolecular built-up film (Y-type film) built up in 27 layers.

Similarly, respective samples of monomolecular built-up films of one layer, 50 layers, 200 layers and 400 layers were obtained.

(2) Method for forming light-absorbing layer:

On the B-layers formed on the glass substrates of respective samples obtained in the above (1), a deposited film of a vanadium phthalocyanine derivative which is a light-absorbing material were formed according to the method as described below.

That is, 7 parts of vanadium phthalocyanine, 1 part of polyvinyl alcohol as the binder and 40 parts of water were mixed, followed further by milling by a ball mill for several hours. The resultant mixture was applied by rotary coating on the B-layer on the substrate to obtain deposited films made of the vanadium phthalocyanine dispersion (film thickness 0.015 $\mu$).

(3) Method for forming A-layer:

As the next step, on the light-absorbing layers on the glass substrates of respective samples obtained in the above (2), monomolecular layer built-up films of a Crystal Violet lactone derivative which is a chromogenic compound were formed.

The monomolecular layer built-up films of said Crystal Violet lactone derivative were formed according to the method as described below.

After the substrate having the B-layer and the light absorbing layer formed thereon was immersed in an acidic solution of pH4 and was held vertical to the water surface, Crystal Violet lactone derivative solution at a concentration of $2 \times 10^{-3}$ mol/liter in chloroform was added dropwise to spread a monomolecular film on the water surface. With the surface pressure set at 30 dyne/cm, the substrate was moved upward and downward at a speed of 2 cm/min. to form respective samples of monomolecular layer built-up films (Y-type films) respective layers built up as shown in Table 2c.

(4) Performance tests:

The optical recording devices of the present invention thus prepared according to the methods as described above and the optical discs having constitutions similar to those of the prior art (the discs were constituted of neither the monomolecular films nor the built-up films thereof) as Comparative examples were used for recording by the information memorizing device as shown in FIG. 5 under the conditions as shown below.

Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 1,800 rpm Reading under the above conditions was performed at a laser output of 1 mW to determine the signal/noise ratio. The results are shown in Table 2c.

TABLE 2c

| Layer consti- | Sample No. | | | | | | |
| --- | --- | --- | --- | --- | --- | --- | --- |
| tution: | 1c | 2c | 3c | 4c | 5c | 6c# | 7c# |
| A-layer (layer number) | 1 | 27 | 50 | 200 | 400 | 0.005 ($\mu$) | 1 ($\mu$) |
| Light-absorbing layer ($\mu$) | 0.015 | 0.015 | 0.015 | 0.015 | 0.015 | 0.015 ($\mu$) | 0.015 ($\mu$) |
| B-layer (layer number) | 1 | 27 | 50 | 200 | 400 | 0.005 ($\mu$) | 1 ($\mu$) |
| Signal/noise ratio (db) | 30 | 58 | 64 | 65 | 64 | 10 | 50 |

Note
represents comparative example, and formation of respective layers was performed according to the rotary coating method.

From the results in Table 2c, No. 1c (where an A layer and a B layer consist of monomolecular films) as compared with No. 6c is markedly more excellent in signal/noise ratio. Such a difference in performance between No. 1c and No. 6c having approximately equal film thicknesses, may be considered to come from smaller amount of defects such as pinholes in No. 1c. Similarly, when No. 2c–No. 5c (when an A layer and a B layer consist of monomolecular built-up films) are compared with No. 7c, it can be observed that No. 2c–No. 5c are more excellent in signal/noise ratio than No. 7c.

EXAMPLE 1d (1) Method for forming B-layer:

A disc substrate of glass of 10 mm in thickness and 180 mm in diameter was thoroughly cleaned. Subsequently, 7 parts of arachidic acid which is an assistant compound, 1 part of polyvinyl alcohol as a binder and 40 parts of water were mixed, followed further by milling by a ball mill for several hours. The resultant mixture was applied by rotary coating on the substrates to prepare respective samples having deposited films made of an arachidic acid dispersion in the binder formed (film thickness 1$\mu$) thereon.

(2) Method for forming light-absorbing layer:

On the B-layer formed on the glass substrates of respective samples obtained in the above (1), monomolecular layer built-up films of a vanadium phthalocyanine derivative which is a light-absorbing material were formed according to the method as described below.

That is, 7 parts of vanadium phthalocyanine, 1 part of polyvinyl alcohol as the binder and 40 parts of water were mixed, followed further by milling by a ball mill for several hours. The resultant mixture was applied by rotary coating on the B-layer on the substrate to obtain deposited films made of the vanadium phthalocyanine dispersion in the binder formed (film thickness 0.015 $\mu$) thereon.

(3) Method for forming A-layer:

As the next step, on the light-absorbing layers on the glass substrates of respective samples obtained in the above (2), monomolecular layer built-up films of a Crystal Violet lactone derivative which is a color forming compound were formed.

The monomolecular layer built-up films of said Crystal Violet lactone derivative were formed according to the method as described below.

After the substrate having the B-layer and the light absorbing layer formed thereon was immersed in an acidic solution of pH4 and was held vertical to the water surface, Crystal Violet lactone derivative solution at a concentration of $2\times10^{-3}$ mol/liter in chloroform was added dropwise to spread a monomolecular film on the water surface. With the surface pressure set at 30 dyen/cm, the substrate was moved upward and downward at a speed of 2 cm/min. to form respective samples of monomolecular layer built-up films (Y-type films) having the respective layers built up as shown in Table 2d.

(4) Performance tests:

The optical recording devices of the present invention thus prepared according to the methods as described above and the optical discs having constitutions similar to those of the prior art (the discs were constituted of neither the monomolecular films nor the built-up films thereof) as Comparative examples were used for recording by the information memorizing device as shown in FIG. 5 under the conditions as show below. Reading reproduction was performed for comparison of the performances of the both recording devices.

(Recording conditions)

Semiconductor laser wavelength: 830 nm
Laser output: 6-9 mW
Recording frequency ; 5 MHz
Rotational number of optical disc: 1,800 rpm Reading under the above conditions was performed at a laser output of 1 mW to determine the signal/noise ratio. The results are shown in Table 2d.

TABLE 2d

| Layer constitution: | Sample No. | | | | | | |
|---|---|---|---|---|---|---|---|
| | 1d | 2d | 3d | 4d | 5d | 6d# | 7d# |
| A-layer (layer number) | 1 | 27 | 50 | 200 | 400 | 0.005 ($\mu$) | 1 ($\mu$) |
| Light-absorbing layer ($\mu$) | 0.015 | 0.015 | 0.015 | 0.015 | 0.015 | 0.015 ($\mu$) | 0.015 ($\mu$) |
| B-layer ($\mu$) | 1 | 1 | 1 | 1 | 1 | 1 ($\mu$) | 1 ($\mu$) |
| Signal/noise ratio (db) | 30 | 59 | 67 | 68 | 64 | 15 | 50 |

Note
represents Comparative example, and formation of respective layers was performed according to the rotary coating method.

From the results in Table 2d, No. 1d (where an A layer consists of a monomolecular film) as compared with No. 6d is markedly more excellent in signal/noise ratio. Such a difference in performance between No. 1d and No. 6d having approximately equal film thicknesses, may be considered to come from smaller amount of defects such as pinhole in No. 1 d. Similarly, when No. 2d-No. 5d (where an A layer consists of a monomolecular layer built-up film) are compared with No. 7d, it can be observed that No. 2d-No. 5d are more excellent in signal/noise ratio than No. 7d.

EXAMPLE 1e (1) Method for forming B-layer:

A disc substrate of glass of 10 mm in thickness and 180 mm in diameter was thoroughly cleaned. Subsequently, 7 parts of arachidic acid which is an assistant compound, 1 parts of polyvinyl alcohol as the binder and 40 parts of water were mixed, followed further by milling by a ball mill for several hours. The resultant mixture was applied by rotary coating on the substrates to prepare respective samples having deposited films of the arachidic acid dispersion in binder formed (film thickness 1 $\mu$) thereon.

(2) Method for forming light-absorbing layer:

On the B-layers formed on the glass substrates of respective samples obtained in the above (1), monomolecular layer built-up films of a vanadium phthalocyanine derivative which is a light-absorbing material were formed by means of the monomolecular layer forming device as described above.

The monomolecular layer built-up film of the vanadium phthalocyanine derivative was formed according to the method as described below.

After the substrate having the B-layer formed thereon was immersed in water and was held vertical to the water surface, a vanadium phthalocyanine derivative solution at a concentration of $2\times10^{-3}$ mol/liter in chloroform was added dropwise onto the water surface to spread a monomolecular film on the water surface. With the surface pressure set at 30 dyne/cm, the substrate was moved upward and downward at a speed of 2 cm/min. to form respective samples of monomolecular layer built-up films (Y-type films) having the respective layers built up as shown in Table 2e.

(3) Method for forming A-layer:

Next, on the light-absorbing layers formed on the glass substrates of the respective samples, deposited films of Crystal Violet lactone which is a chromogenic compound were formed according to the method as described below.

That is, 7 parts of Crystal Violet lactone, 1 part of polyvinyl alcohol as the binder and 100 parts of water were mixed, followed further by milling by a ball mill for several hours. The resultant mixture was applied by rotary coating on the light-absorbing layer on the substrate to obtain deposited films of the Crystal Violet lactone dispersion in binder formed (film thickness 1$\mu$).

(4) Performance tests:

The optical recording devices of the present invention thus prepared according to the methods as described above and the optical discs having constitutions similar to those of the prior art (the discs were constituted of neither the monomolecular films nor the built-up films thereof) as Comparative examples were used for recording by the information memorizing device as shown in FIG. 5 under the conditions as show below. Reading reproduction was performed for comparison of the performances of the both recording devices.

(Recording conditions)

Semiconductor laser wavelength: 830 nm
Laser output: 6-9 mW
Recording frequency: 5 MHz
Rotational number of optical disc: 1,800 rpm Reading under the above conditions was performed at a laser output of 1 mW to determine the signal/noise ratio. The results are shown in Table 2e.

TABLE 2e

| Layer constitution: | Sample No. | | | | | | |
|---|---|---|---|---|---|---|---|
| | 1e | 2e | 3e | 4e | 5e | 6e# | 7e# |
| A-layer ($\mu$) | 1 | 1 | 1 | 1 | 1 | 1 ($\mu$) | 1 ($\mu$) |
| Light-absorbing | 1 | 2 | 4 | 6 | 8 | 0.005 | 0.015 |

TABLE 2e-continued

| Layer consti- | Sample No. | | | | | | |
|---|---|---|---|---|---|---|---|
| tution: | 1e | 2e | 3e | 4e | 5e | 6e# | 7e# |
| layer (layer number) | | | | | | (μ) | (μ) |
| B-layer (μ) | 1 | 1 | 1 | 1 | 1 | 1 (μ) | 1 (μ) |
| Signal/noise ratio (db) | 45 | 59 | 68 | 70 | 64 | 5 | 50 |

Note
represents Comparative example, and formation of respective layers was performed according to the rotary coating method.

From the results in Table 2e, No. 1e (where a light-absorbing layer consists of a monomolecular film) as compared with No. 6e is markedly more excellent in signal/noise ratio. Such difference in performance between No. 1e and No. 6e having approximately equal film thicknesses, may be considered to come from smaller amount of defects such as pinholes. Similarly, when No. 2e–No. 5e (where a light-absorbing layer consists of a monomolecular layer built-up film) are compared with No. 7e, it can be observed that No. 2e–No. 5e are more excellent in signal/noise ratio than No. 7e.

EXAMPLE 1f (1) Method for forming light-absorbing layer:

A disc substrate of glass of 10 mm in thickness and 180 mm in diameter was thoroughly cleaned. Subsequently, by means of the monomolecular layer forming device as described above a monomolecular layer built-up layer of vanadium phthalocyanine derivative which is a light-absorbing substance.

The monomolecular layer built-up film of said vanadium phthalocyanine derivative was formed according to the method as described below.

After the substrate was immersed in water and was held vertical to the water surface, a vanadium phthalocyanine derivative solution at a concentration of $2 \times 10^{-3}$ mol/liter in chloroform was added dropwise to spread a monomolecular film on the water surface. With the surface pressure set at 30 dyne/cm, the substrate was moved upward and downward at a speed of 2 cm/min. to prepare a monomolecular layer built-up film (Y-type film) built up in 2 layers.

Similarly, respective samples of monomolecular built-up films of one layer, 4 layers, 6 layers and 8 layers were obtained.

However, preparation of only one layer (monomolecular layer) was carried out by first spreading a monomolecular film over the water surface according to the method as described above and then permitting the film to be attached on the substrate when it was sunk into water (X-type).

(2) Method for forming B-layer:

On the light-absorbing layers formed on the glass substrates of respective samples obtained in the above (1), monomolecular layer built-up films of arachidic acid which is an assistant compound were formed by means of the monomolecular layer forming device as described above.

The monomolecular layer built-up film of the said arachidic acid was formed according to the method as described below.

After the substrate having the light-absorbing layer formed thereon was immersed in water and was held vertical to the water surface, an arachidic acid solution at a concentration of $2 \times 10^{-3}$ mol/liter in chloroform was added dropwise onto the water surface to spread a monomolecular film on the water surface. With the surface pressure set at 30 dyne/cm, the substrate was moved upward and downward at a speed of 2 cm/min. to form respective samples of monomolecular layer built-up films (Y-type films) having the respective layers built up as shown in Table 2f.

(3) Method for forming A-layer:

As the next step, on the B layers on the glass substrates of respective samples obtained in the above (2), monomolecular built-up films of a Crystal Violet lactone derivative which is chromogenic compound were formed.

The monomolecular layer built-up films of said Crystal Violet lactone derivative were formed according to the method as described below.

After the substrate having the light absorbing layer and the B-layer formed thereon was immersed in an acidic solution of pH4 and was held vertical to the water surface, Crystal Violet lactone derivative solution at a concentration of $2 \times 10^{-3}$ mol/liter in chloroform was added dropwise to spread a monomolecular film on the water surface. With the surface pressure set at 30 dyne/cm, the substrate was moved upward and downward at a speed of 2 cm/min. to form respective samples of monomolecular layer built-up films (Y-type films) having the respective layers built up as shown in Table 2f.

(4) Performance tests:

The optical recording devices of the present invention thus prepared according to the methods as described above and the optical discs having constitutions similar to those of the prior art (the discs were constituted of neither the monomolecular films nor the built-up films thereof) as Comparative examples were used for recording by the information memorizing device as shown in FIG. 5 under the conditions as show below. Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 1.800 rpm Reading under the above conditions was performed at a laser output of 1 mW to determine the signal/noise ratio. The results arc shown in Table 2f.

TABLE 2f

| Layer constitution | Sample No. | | | | | Layer constitution: | Sample No. | |
|---|---|---|---|---|---|---|---|---|
| | 1f | 2f | 3f | 4f | 5f | | 6f# | 7f# |
| A-layer (layer number) | 1 | 27 | 51 | 201 | 401 | A-layer (μ) | 0.005 (μ) | 1 (μ) |
| B-layer (layer number) | 1 | 27 | 51 | 201 | 401 | Light-absorbing layer (μ) | 0.005 (μ) | 0.95 (μ) |
| Light-absorbing layer (layer number) | 1 | 2 | 4 | 6 | 8 | B-layer (μ) | 0.005 (μ) | 1 (μ) |
| Signal/noise | 40 | 60 | 67 | 70 | 65 | Signal/noise | 5 | 50 |

TABLE 2f-continued

| Layer constitution ratio (db) | Sample No. | | | | | Layer constitution: ratio (db) | Sample No. | |
|---|---|---|---|---|---|---|---|---|
| | 1f | 2f | 3f | 4f | 5f | | 6f# | 7f# |

Note
represents Comparative example, and formation of respective layers was performed according to the rotary coating method.

From the results in Table 2f, No. 1f (when respective layers consist of monomolecular films) as compared with No. 6f is markedly more excellent in signal/noise ratio. Such a difference in performance between No. 1f and No. 6f having approximately equal film thicknesses, may be considered to come from smaller amount of defects such as pinholes and higher molecular orientation in No. 1f. Similarly, when No. 2f–No. 5f (when respective layers consist of monomolecular layer built-up films) are compared with No. 7f, it can be observed that No. 2f–No. 5f are more excellent in signal/noise ratio than No. 7f.

EXAMPLE 1g (1) Method for forming light-absorbing layer:

A disc substrate of glass of 10 mm in thickness and 180 mm in diameter was thoroughly cleaned. Subsequently, 7 parts of vanadium phthalocyanine which is a light-absorbing material, 1 part of polyvinyl alcohol as a binder and 40 parts of water were mixed, followed further by milling by a ball mill for several hours. The resultant mixture was applied by rotary coating on the substrates to prepare respective samples having deposited films of the vanadium phthalocyanine dispersion in binder formed (film thickness 0.015 $\mu$) thereon.

(2) Method for forming B-layer:

Next, on the light-absorbing layers formed on the glass substrates of respective samples obtained in the above (1), monomolecular layer built-up films of arachidic acid which is an assistant compound were formed by means of the monomolecular layer forming device as described above.

The monomolecular layer built-up film of said arachidic acid was formed according to the method as described below.

After the substrate having the light-absorbing layer formed thereon was immersed in water and was held vertical to the water surface, an arachidic acid solution at a concentration of $2 \times 10^{-3}$ mol/liter in chloroform was added dropwise onto the water surface to spread a monomolecular film on the water surface. With the surface pressure set at 30 dyne/cm, the substrate was moved upward and downward at a speed of 2 cm/min. to form respective samples of monomolecular built-up films (Y-type films) having the respective layers built up as shown in Table 2g.

(3) Method for forming A-layer:

As the next step, on the B layers on the glass substrates of respective samples obtained in the above (2), monomolecular layer built-up films of a Crystal Violet lactone derivative which is a chromogenic compound were formed.

The monomolecular layer built-up films of said Crystal Violet lactone derivative were formed according to the method as described below.

After the substrate having the light absorbing layer and the B-layer formed thereon was immersed in an acidic solution of pH 4 and was held vertical to the water surface, a Crystal Violet lactone derivative solution at a concentration of $2 \times 10^{-3}$ mol/liter in chloroform was added dropwise to spread a monomolecular film on the water surface. With the surface pressure set at 30 dyne/cm, the substrate was moved up and down at a speed of 2 cm/min. to form respective samples of monomolecular layer built-up films (Y-type films) having the respective layers built up as shown in Table 2g.

(4) Performance tests:

The optical recording devices of the present invention thus prepared according to the methods as described above and the optical discs having constitutions similar to those of the prior art (the discs were constituted of neither the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 1,800 rpm Reading under the above conditions was performed at a laser output of 1 mW to determine the signal/noise ratio. The results are shown in Table 2g.

TABLE 2g

| Layer constitution | Sample No. | | | | | Layer constitution: | Sample No. | |
|---|---|---|---|---|---|---|---|---|
| | 1g | 2g | 3g | 4g | 5g | | 6g# | 7g# |
| A-layer (layer number) | 1 | 27 | 51 | 201 | 401 | A-layer ($\mu$) | 0.005 ($\mu$) | 1 ($\mu$) |
| B-layer (layer number) | 1 | 27 | 51 | 201 | 401 | Light-absorbing layer ($\mu$) | 0.015 ($\mu$) | 0.015 ($\mu$) |
| Light-absorbing layer ($\mu$) | 0.015 | 0.015 | 0.015 | 0.015 | 0.015 | B-layer ($\mu$) | 0.015 ($\mu$) | 1 ($\mu$) |
| Signal/noise ratio (db) | 29 | 57 | 63 | 65 | 64 | Signal/noise ratio (db) | 10 | 50 |

Note
represents Comparative example, and formation of respective layers was performed according to the rotary coating method.

From the results in Table 2g, No. 1g (where an A-layer and a B-layer consist of monomolecular films) as compared with No. 6g is markedly more excellent in signal/noise ratio. Such a difference in performance between No. 1g and No. 6g having approximately equal film thicknesses, may be considered to come from smaller amount of defects such as pinholes and higher molecular orientation in No. 1g. Similarly, when No. 2g–No. 5g (when an A-layer and a B-layer consist of monomolecular built-up films) are compared with No. 7g, it can be observed that No. 2g–No. 5g are more excellent in signal/noise ratio than No. 7g.

EXAMPLE 1h (1) Method for forming light-absorbing layer:

A disc substrate of glass of 10 mm in thickness and 180 mm in diameter was thoroughly cleaned. Subsequently, by means of the monomolecular layer forming device as described above, a monomolecular layer built-up layer of vanadium phthalocyanine derivative which a light absorbing substance.

The monomolecular layer built-up film of said vanadium phthalocyanine derivative was formed according to the method as described below.

After the substrate was immersed in water and was held vertical to the water surface, a vanadium phthalocyanine derivative solution at a concentration of $2 \times 10^{-3}$ mol/liter in chloroform was added dropwise to spread a monomolecular film on the water surface. With the surface pressure set at 30 dyne/cm, the substrate was moved upward and downward at a speed of 2 cm/min. to prepare a monomolecular layer built-up film (Y-type film) built up in 2 layers.

Similarly, samples of monomolecular layer built-up films of one layer, 4 layers, 6 layers and 8 layers were obtained.

However, preparation of only one layer (monomolecular layer) was carried out by firstly spreading a monomolecular film over the water surface according to the method as described above and then permitting the film to be attached on the substrate when it was sunk into water (X-type).

(2) Method for forming B layer:

On the light-absorbing layers formed on the glass substrates of respective samples obtained in the above (1), monomolecular layer built-up films of arachidic acid which is an assistant compound were formed by means of the monomolecular layer forming device as described above.

The monomolecular layer built-up film of said arachidic acid was formed according to the method as described below.

After the substrate having the light-absorbing-layer formed thereon was immersed in water and was held vertical to the water surface, an arachidic acid solution at a concentration of $2 \times 10^{-3}$ mol/liter in chloroform was added dropwise onto the water surface to spread a monomolecular film on the water surface. With the surface pressure set at 30 dyne/cm, the substrate was moved upward and downward at a speed of 2 cm/min. to form respective samples of monomolecular layer built-up films (Y-type films) having the respective layers built up as shown in Table 2h.

(3) Method for forming A-layer

Next, on the B layers formed on the glass substrates of the respective samples, deposited films of Crystal Violet lactone which is chromogenic compound were formed according to the method as described below.

That is, 7 parts of Crystal Violet lactone, 1 part of polyvinyl alcohol as a binder and 100 parts of water were mixed, followed further by milling by a ball mill for several hours. The resultant mixture was applied by rotary coating on the B layer on the substrate to obtain deposited films made of the Crystal Violet lactone dispersion in binder formed (film thickness 1 $\mu$) thereon.

(4) Performance tests:

The optical recording devices of the present invention thus prepared according to the methods as described above and the optical discs having constitutions similar to those of the prior art (the discs were constituted of neither the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 1,800 rpm Reading under the above conditions was performed at a laser output of 1 mW to determine the signal/noise ratio. The results are shown in Table 2h.

TABLE 2h

| Layer constitution | Sample No. | | | | | Layer constitution: | Sample No. | |
|---|---|---|---|---|---|---|---|---|
| | 1h | 2h | 3h | 4h | 5h | | 6h# | 7h# |
| A-layer ($\mu$) | 1 | 1 | 1 | 1 | 1 | A-layer ($\mu$) | 1 ($\mu$) | 1 ($\mu$) |
| B-layer (layer number) | 1 | 27 | 51 | 201 | 401 | Light-absorbing layer ($\mu$) | 0.005 ($\mu$) | 0.015 ($\mu$) |
| Light-absorbing layer (layer number) | 1 | 2 | 4 | 6 | 8 | B-layer ($\mu$) | 0.005 ($\mu$) | 1 ($\mu$) |
| Signal/noise ratio (db) | 40 | 59 | 66 | 68 | 64 | Signal/noise ratio (db) | 10 | 50 |

Note
represents Comparative example, and formation of respective layers was performed according to the rotary coating method.

From the results in Table 2h, No. 1h (when a B-layer and a light-absorbing layer consist of monomolecular films) as compared with No. 6h is markedly more excellent in signal/noise ratio. Such a difference in performance between No. 1h and No. 6h, although having approximately equal film thicknesses, may be considered to come from smaller amount of defects such as pinholes and higher molecular orientation in No. 1h. Similarly, when No. 2h–No. 5h (where respective layers consist of monomolecular built-up films) are compared with No. 7h, it can be observed that No. 2h–No. 5h are more excellent in signal/noise ratio than No. 7h.

EXAMPLE 1i (1) Method for forming light-absorbing layer:

A disc substrate of glass of 10 mm in thickness and 180 mm in diameter was thoroughly cleaned. Subsequently, 7 parts of vanadium phthalocyanine which is a light-absorbing material, 1 part of polyvinyl alcohol as a binder and 40 parts of water were mixed, followed further by milling by a ball mill for several hours. The resultant mixture was applied by rotary coating on the substrates to prepare respective samples having deposited films made of the vanadium phthalocyanine dispersion in binder formed (film thickness 0.015 μ) thereon.

(2) Method for forming B-layer

On the light-absorbing layers formed on the glass substrates of respective samples obtained in the above (1), monomolecular layer built-up films of arachidic acid which is an assistant compound were formed by means of the monomolecular layer forming device as described above.

The monomolecular layer built-up film of the said arachidinic acid was formed according to the method as described below.

After the substrate having the light-absorbing-layer formed thereon was immersed in water and was held vertical to the water surface, an arachidic acid solution at a concentration of $2 \times 10^{-3}$ mol/liter in chloroform was added dropwise onto the water surface to spread a monomolecular film on the water surface. With the surface pressure set at 30 dyne/cm, the substrate was moved upward and downward at a speed of 2 cm/min. to form respective samples of monomolecular layer built-up films (Y-type films) having the respective layers built up as shown in Table 2i.

(3) Method for forming A-layer:

On the B-layers formed on the glass substrates of the respective samples, deposited films of Crystal Violet lactone which is a color forming compound were formed according to the method as described below.

That is, 7 parts of Crystal Violet lactone, 1 part of polyvinyl alcohol as a binder and 100 parts of water were mixed, followed further by milling by a ball mill for several hours. The resultant mixture was applied by rotary coating on the B-layer on the substrate to obtain deposited films made of the Crystal Violet lactone dispersion in binder formed (film thickness 1 μ) thereon.

(4) Performance tests:

The optical recording devices of the present invention thus prepared according to the methods as described above and the optical discs having constitutions similar to those of the prior art (the discs were constituted of neither the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 1,800 rpm Reading under the above conditions was performed at a laser output of 1 mW to determine the signal/noise ratio. The results are shown in Table 2i.

TABLE 2i

| Layer constitution: | Sample No. | | | | | | Sample No. | |
|---|---|---|---|---|---|---|---|---|
| | 1i | 2i | 3i | 4i | 5i | | 6i# | 7i# |
| A-layer (μ) | 1 | 1 | 1 | 1 | 1 | A-layer (μ) | 1 | 1 |
| B-layer (layer number) | 1 | 27 | 51 | 201 | 401 | Light-absorbing layer (μ) | 0.015 | 0.015 |
| Light-absorbing layer (μ) | 0.015 | 0.015 | 0.015 | 0.015 | 0.015 | B-layer (μ) | 0.005 | 1 |
| Signal/noise ratio (db) | 30 | 58 | 66 | 67 | 64 | Signal/noise ratio (db) | 15 | 50 |

Note
represents Comparative example, and formation of respective layers was performed according to the rotary coating method.

From the results in Table 2i, No. 1i (where a B-layer consists of a monomolecular film) as compared with No. 6i is markedly more excellent in signal/noise ratio. Such difference in performance between No. 1i and No. 6i having approximately equal film thickness, may be considered to result from smaller amount of defects such as pinholes in No. 1i. Similarly, when No. 2i–No. 5i (where a B-layer consists of a monomolecular layer built-up film) are compared with No. 7i, it can be observed that No. 2i–No. 5i are more excellent in signal/noise ratio than No. 7i.

EXAMPLE 1j (1) Method for forming light-absorbing layer:

A disc substrate of glass of 10 mm in thickness and 180 mm in diameter was thoroughly cleaned. Subsequently, by means of the monomolecular layer forming device as described above, a monomolecular layer built-up layer of vanadium phthalocyanine derivative which a light-absorbing substance.

The monomolecular layer built-up film of said vanadium phthalocyanine derivative was formed according to the method as described below.

After the substrate was immersed in water and was held vertical to the water surface, a vanadium phthalocyanine derivative solution at a concentration of $2 \times 10^{-3}$ mol/liter in chloroform was added dropwise to spread a monomolecular film on the water surface. With the surface pressure set at 30 dyne/cm, the substrate was moved upward and downward at a speed of 2 cm/min. to prepare a monomolecular layer built-up film (Y-type film) built up in 2 layers.

Similarly, respective samples of monomolecular layer built-up films of one layer, 4 layers, 6 layers and 8 layers were obtained.

(2) Method for forming B-layer:

On the light-absorbing layers formed on the glass substrates of respective samples obtained in the above (1), monomolecular layer built-up films of arachidic acid which is an assistant compound were formed according to the method as described below.

That is, 7 parts of arachidic acid, 1 part of polyvinyl alcohol as a binder and 40 parts of water were mixed, followed further by milling by a ball mill for several hours. The resultant mixture was applied by rotary coating on the light-absorbing layer on the substrate to obtain deposited films made of the arachidic acid dispersion in binder formed (film thickness 1 μ) thereon.

(3) Method for forming A-layer:

On the B-layers formed on the glass substrates of the respective samples, deposited films of Crystal Violet lactone which is a chromogenic compound were formed according to the method as described below.

That is, 7 parts of Crystal Violet lactone, 1 part of polyvinyl alcohol as the binder and 100 parts of water were mixed, followed further by milling by a ball mill for several hours. The resultant mixture was applied by rotary coating on the B-layer on the substrate to obtain deposited films made of the Crystal Violet lactone dispersion in binder formed (film thickness 1μ) thereon.

(4) Performance tests:

The optical recording devices of the present invention thus prepared according to the methods as described above and the optical discs having constitutions similar to those of the prior arts (the discs were constituted of neither of the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 1,800 rpm Reading under the above conditions was performed at a laser output of 1 mW to determine the signal/noise ratio. The results are shown in Table 2j.

TABLE 2j

| Layer constitution: | Sample No. | | | | | | |
|---|---|---|---|---|---|---|---|
| | 1i | 2j | 3j | 4j | 5j | 6j# | 7j# |
| A-layer (μ) | 1 | 1 | 1 | 1 | 1 | 1 | 1 |
| B-layer (μ) | 1 | 1 | 1 | 1 | 1 | 0.005 (μ) | 0.015 (μ) |
| Light-absorbing layer (layer number) | 1 | 2 | 4 | 6 | 8 | 1 | 1 |
| Signal/noise ratio (db) | 20 | 55 | 65 | 67 | 60 | 5 | 50 |

Note
represents Comparative example, and formation of respective layers was performed according to the rotary coating method.

From the results in Table 2j, No. 1j (where a light-absorbing layer consists of a monomolecular film) as compared with No. 6j is markedly more excellent in signal/noise ratio. Such a difference in performance between No. 1j and No. 6j having approximately equal film thicknesses, may be considered to result from smaller amount of defects such as pinholes in No. 1j. Similarly, when No. 2j–No. 5j (where a light-absorbing layer consist of a monomolecular layer built-up film) are compared with No. 7j, it can be observed that No. 2j–No. 5j are more excellent in signal/noise ratio than No. 7j.

EXAMPLE 1k (1) Method for forming B-layer:

A disc substrate of glass of 10 mm in thickness and 180 mm in diameter was thoroughly cleaned. Subsequently, by means of the monomolecular layer forming device as described above, a monomolecular layer built-up layer of phenolphthalein derivative which is phenolic compound.

The monomolecular layer built-up film of said phenolphthalein derivative was formed according to the method as described below.

After the substrate was immersed in wafer and was held vertical to the wafer surface, a phenolphthalein derivative solution at a concentration of $2 \times 10^{-3}$ mol/liter in chloroform was added dropwise to spread a monomolecular film on the wafer surface. With the surface pressure set at 30 dyne/cm, the substrate was moved upward and downward at a speed of 2 cm/min. to prepare a monomolecular built-up film (Y-type film) built-up in 27 layers.

Similarly, respective samples of monomolecular layer built-up films of one layer, 50 layers, 200 layers and 400 layers were obtained.

(2) Method for forming light-absorbing layer:

On the B-layers formed on the glass substrates of respective samples obtained in the above (1). a monomolecular layer built-up film of a vanadium phthalocyanine derivative which is a light-absorbing material were formed by means of the monomolecular layer forming device as described above.

The monomolecular layer built-up film of the vanadium phthalocyanine derivative was formed according to the method as described below.

After the substrate having the B-layer formed thereon was immersed in wafer and was held vertical to the water surface, a vanadium phthalocyanine derivative solution at a concentration of $2 \times 10^{-3}$ mol/liter in chloroform was added dropwise onto the wafer surface to spread a monomolecular film on the water surface. With the surface pressure set at 30 dyne/cm, the substrate was moved upward and downward at a speed of 2 cm/min. to form respective samples of monomolecular layer built-up films (Y-type films) having the respective layers built-up as shown in Table 2k.

(3) Method for forming A-layer:

As the next step, on the light-absorbing layers on the glass substrates of respective samples obtained in the above (2), monomolecular layer built-up films of a Crystal Violet lactone derivative which is a leuco derivative of dye were formed.

The monomolecular layer built-up films of said Crystal Violet lactone derivative were formed according to the method as described below.

After the substrate having the B-layer and the light-absorbing layer formed thereon was immersed in an acidic solution of pH 4 and was held vertical to the wafer surface, a Crystal Violet lactone derivative solution at a concentration of $2 \times 10^{-3}$ mol/liter in chloroform was added dropwise to spread a monomolecular film on the wafer surface. With the surface pressure set at 30 dyne/cm, the substrate was moved at a speed of 2 cm/min. to form respective samples of monomolecular layer built-up films (Y-type films) respective layers built up shown in Table 2k.

(4) Performance tests:

The optical recording devices of the present invention thus prepared according to the methods as described above and the optical discs having constitutions similar to those of the prior arts (the discs were constituted of neither of the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 1,800 rpm Reading under the above conditions was performed at a laser output of 1 mW to determine the signal/noise ratio. The results are shown in Table 2k.

TABLE 2k

| Layer consti- | Sample No. | | | | | | |
|---|---|---|---|---|---|---|---|
| tution: | 1k | 2k | 3k | 4k | 5k | 6k# | 7k# |
| A-layer (layer number) | 1 | 27 | 50 | 200 | 400 | 0.005 ($\mu$) | 1 ($\mu$) |
| Light-absorbing layer (layer number) | 1 | 2 | 4 | 6 | 8 | 0.005 ($\mu$) | 0.015 ($\mu$) |
| B-layer (layer number) | 1 | 27 | 50 | 200 | 400 | 0.005 ($\mu$) | 1 ($\mu$) |
| Signal/noise ratio (db) | 45 | 62 | 70 | 75 | 68 | 5 | 50 |

Note
represents Comparative example, and formation of respective layers was performed according to the rotary coating method.

From the results in Table 2k. No. 1k (where respective layers consists of monomolecular films) as compared with No. 6k is markedly more excellent in signal/noise ratio. Such a difference in performance between No. 1k and No. 6k having approximately equal film thicknesses, may be considered to result from smaller amount of defects such as pinholes in No. 1k. Similarly, when No. 2k–5k (where respective layers consist of monomolecular layer built-up films) are compared with No. 7k, it can be observed that No. 2k–5k are more excellent in signal/noise ratio than No. 7k.

EXAMPLE 11

(1) Method for forming B-layer:

A disc substrate of glass of 10 mm in thickness and 180 mm in a diameter was thoroughly cleaned. Subsequently, 7 parts of phenolphthalein which is a phenolic compound, 1 part of polyvinyl alcohol as a binder and 40 parts of water were mixed, followed further by milling by a ball mill for several hours. The resultant mixture was applied by rotary coating on the substrate to prepare respective samples having deposited films made of the phenolphthalein dispersion in binder formed (film thickness 1$\mu$) thereon.

(2) Method for forming light-absorbing layer:

Next, on the B layers formed on the glass substrates of respective samples obtained in the above (1), monomolecular layer built-up films of a vanadium phthalocyanine derivative which is a light-absorbing material were formed by means of the monomolecular layer forming device as described above.

The monomolecular layer built-up film of the vanadium phthalocyanine derivative was formed according to the method as described below.

After the substrate having the B-layer formed thereon was immersed in wafer and was held vertical to the water surface, a vanadium phthalocyanine derivative solution at a concentration of $2 \times 10^{-3}$ mol/liter in chloroform was added dropwise onto the wafer surface to spread a monomolecular film on the wafer surface. With the surface pressure set at 30 dyne/cm, the substrate was moved upward and downward at a speed of 2 cm/min. to form respective samples of monomolecular layer built-up films (Y-type films) having the repsective layers built-up as shown in Table 21.

(3) Method for forming A layer:

On the light-absorbing layers on the glass substrates of respective samples obtained in the above (2), monomolecular layer built-up films of a Crystal Violet lactone derivative which is a leuco derivative of dye were formed.

The monomolecular layer built-up films of said Crystal Violet lactone derivative were formed according to the method as described below.

After the substrate having the B-layer and the light-absorbing layer formed thereon was immersed in an acidic solution of pH 4 and was held vertical to the water surface, a Crystal Violet lactone derivative solution at a concentration of $2 \times 10^{-3}$ mol/liter in chloroform was added dropwise to spread a monomolecular film on the wafer surface. With the surface pressure set at 30 dyne/cm, the substrate was moved upward and downward at a speed of 2 cm/min. to form respective samples of monomolecular layer built-up films (Y-type films) having the respective layers built up as shown in Table 2 l.

(4) Performance tests:

The optical recording devices of the present invention thus prepared according to the methods as described above and the optical discs having constitutions similar to those of the prior arts (the discs were constituted of neither of the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 800 rpm Reading under the above conditions was performed at a laser output of 1 mW to determine the signal/noise ratio. The results are shown in Table 2l.

TABLE 2l

| Layer | Sample No. | | | | | | |
|---|---|---|---|---|---|---|---|
| constituion: | 1l | 2l | 3l | 4l | 5l | 6l# | 7l# |
| A-layer (layer number) | 1 | 27 | 50 | 200 | 400 | 0.005 ($\mu$) | 1 ($\mu$) |
| Light-absorbing layer (layer number) | 1 | 2 | 4 | 6 | 8 | 0.005 ($\mu$) | 0.015 ($\mu$) |
| B-layer ($\mu$) | 1 | 1 | 1 | 1 | 1 | 1 ($\mu$) | 1 ($\mu$) |
| Signal/noise ratio (db) | 46 | 62 | 69 | 74 | 65 | 10 | 50 |

Note
represents Comparative example, and formation of respective layers was performed according to the rotary coating method.

From the results in Table 2l, No. 1l (where an A-layer and a light-absorbing layer consist of monomolecular films) as compared with No. 6l is markedly more excellent in signal/noise ratio. Such difference in performance between No. 1l and No. 6 l having approximately equal film thicknesses, may be considered to result from a smaller amount of defects such as pinholes in No. 1 l. Similarly, when No. 2 l–No. 5 l (where A-layer and light-absorbing layer consist of monomolecular built-up films) are compared with No. 7 l, it can be observed that No. 2 l–No. 5 l are more excellent in signal/noise ratio than No. 7 l.

EXAMPLE 1m (1) Method for forming B-layer:

A disc substrate of glass of 10 mm in thickness and 180 mm in diameter was thoroughly cleaned. Subsequently, by means of the monomolecular layer forming device as described above, a monomolecular layer built-up layer of phenolphthalein derivative which is phenolic compound.

The monomolecular layer built-up film of said phenolphthalein derivative was formed according to the method as described below.

After the substrate was immersed in wafer and was held vertical to the water surface, a phenolphthalein derivative solution at a concentration of $2 \times 10^{-3}$ mol/-liter in chloroform was added dropwise to spread a monomolecular film on the wafer surface. With the surface pressure set at 30 dyne/cm, the substrate was moved upward and downward at a speed of 2 cm/min. to prepare a monomolecular built-up film (Y-type film) built-up in 27 layers.

Similarly, respective samples of monomolecular layer built-up films of one layer, 50 layers, 200 layers and 400 layers were obtained.

(2) Method for forming light-absorbing layer:

On the B-layers formed on the glass substrates of respective samples obtained in the above (1), a monomolecular layer built-up films of a vanadium phthalocyanine derivative which is a light-absorbing material were formed according to the method as described below.

That is, 7 parts of vanadium phthalocyanine, 1 part of polyvinyl alcohol as a binder and 40 parts of wafer were mixed, followed further by milling by a ball mill for several hours. The resultant mixture was applied by rotary coating on the B-layer on the substrate to obtain deposited films made of the vanadium phthalocyanine dispersion in binder formed (film thickness 0.015 $\mu$) thereon.

(3) Method for forming A-layer:

On the light-absorbing layers on the glass substrates of repsective samples obtained in the above (2), monomolecular built-up films of a Crystal Violet lactone derivative which is a leuco derivative of dye were formed.

The monomolecular built-up films of said Crystal violet lactone derivative were formed according to the method as described below.

After the substrate having the B-layer and the light-absorbing layer formed thereon was immersed in an acidic solution of pH 4 and was held vertical to the wafer surface, a Crystal Violet lactone derivative solution at a concentration of $2 \times 10^{-3}$ mol/liter in chloroform was added dropwise to spread a monomolecular film on the wafer surface. With the surface pressure set at 30 dyne/cm, the substrate was moved upward and downward at a speed of 2 cm/min. to form respective samples of monomolecular layer built-up films (Y type films) having the respective layers built-up as shown in Table 2m.

(4) Performance tests:

The optical recording devices of the present invention thus prepared according to the methods as described above and the optical discs having constitutions similar to those of the prior arts (the discs were constituted of neither of the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 1,800 rpm Reading under the above conditions was performed at a laser output of 1 mW to determine the signal/noise ratio. The results are shown in Table 2m.

TABLE 2m

| Layer constitution: | Sample No. | | | | | | |
|---|---|---|---|---|---|---|---|
| | 1m | 2m | 3m | 4m | 5m | 6m# | 7m# |
| A-layer (layer number) | 1 | 27 | 50 | 200 | 400 | 0.005 ($\mu$) | 1 ($\mu$) |
| Light-absorbing layer | 0.015 | 0.015 | 0.015 | 0.015 | 0.015 | 0.015 ($\mu$) | 0.015 ($\mu$) |
| B-layer (layer number) | 1 | 27 | 50 | 200 | 400 | 0.005 ($\mu$) | 1 ($\mu$) |
| Signal/noise ratio (db) | 35 | 60 | 67 | 70 | 67 | 10 | 50 |

Note
represents Comparative example, and formation of respective layers was performed according to the rotary coating method.

From the results in Table 2m, No. 1m (where an A-layer and a B-layer consist of monomolecular films) as compared with No. 6m is markedly more excellent in signal/noise ratio. Such a difference in performance between No. 1m and No. 6m having approximately equal film thicknesses, may be considered to result from a smaller amount of defects such as pinholes in No. 1m. Similarly, when No. 2m–No. 5m (where A-layer and B-layer consist of monomolecular layer built-up films) are compared with No. 7m, it can be observed that No. 2m–No. 5m are more excellent in signal/noise ratio than No. 7m.

EXAMPLE 1n (1) Method for forming B-layer:

A disc substrate of glass of 10 mm in thickness and 180 mm in diameter was thoroughly cleaned. Subsequently, by means of the monomolecular layer forming device as described above, a monomolecular layer built-up layer of phenolphthalein derivative which is phenolic compound.

The monomolecular layer built-up film of said phenolphthalein derivative was formed according to the method as described below.

After the substrate was immersed in wafer and was held vertical to the water surface, a phenolphthalein derivative solution at a concentration of $2 \times 10^{-3}$ mol/-liter in chloroform was added dropwise to spread a monomolecular film on the wafer surface. With the surface pressure sot at 30 dyne/cm, the substrate was moved upward and downward at a speed of 2 cm/min. to prepare a monomolecular layer built-up film (Y-type film) built-up in 27 layers.

Similarly, respective samples of monomolecular layer built-up films of one layer, 50 layers, 200 layers and 400 layers were obtained.

(2) Method for forming light-absorbing layer:

On the B layers formed on the glass substrates of respective samples obtained in the above (1), monomolecular layer built-up films of a vanadium phthalocyanine derivative which is a light-absorbing material were formed by means of the monomolecular layer forming device as described above.

The monomolecular layer built-up film of the vanadium phthalocyanine derivative was formed according to the method as described below.

After the substrate having the B-layer formed thereon was immersed in wafer and was held vertical to the water surface, a vanadium phthalocyanine derivative solution at a concentration of $2 \times 10^{-3}$ mol/liter in chloroform was added dropwise onto the wafer surface to spread a monomolecular film on the wafer surface. With the surface pressure set at 30 dyne/cm, the substrate was moved upward and downward at a speed of 2 cm/min. to form respective samples of monomolecular layer built-up films (Y-type films) having the repsective layers built-up as shown in Table 2n.

(3) Method for forming A-layer:

On the light-absorbing layers formed on the glass substrates of the respective samples, deposited films of Crystal Violet lactone which is a leuco derivative of dye were formed according to the method as described below.

That is, 7 parts of Crystal Violet lactone, 1 part of polyvinyl alcohol as the binder and 100 parts of water were mixed, followed further by milling by a ball mill for several hours. The resultant mixture was applied by rotary coating on the light-absorbing layer on the substrate to obtain deposited films made of the Crystal Violet lactone dispersion in binder formed (film thickness 1 $\mu$) thereon.

(4) Performance tests:

The optical recording devices of the present invention thus prepared according to the methods as described above and the optical discs having constitutions similar to those of the prior arts (the discs were constituted of neither of the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 1,800 rpm Reading under the above conditions was performed at a laser output of 1 mW to determine the signal/noise ratio. The results are shown in Table 2n.

TABLE 2n

| Layer constitution: | Sample No. | | | | | | |
|---|---|---|---|---|---|---|---|
| | 1n | 2n | 3n | 4n | 5n | 6n# | 7n# |
| A-layer ($\mu$) | 1 | 1 | 1 | 1 | 1 | 0.005 ($\mu$) | 1 ($\mu$) |
| Light-absorbing layer (layer number) | 1 | 2 | 4 | 6 | 8 | 0.005 ($\mu$) | 0.015 ($\mu$) |
| B-layer (layer number) | 1 | 27 | 50 | 200 | 400 | 1 | 1 |
| Signal/noise ratio (db) | 47 | 61 | 68 | 72 | 66 | 10 | 50 |

Note
represents Comparative example, and formation of respective layers was performed according to the rotary coating method.

From the results in Table 2n, No. 1n (where a B-layer and a light-absorbing layer consist of monomolecular films) as compared with No. 6n is markedly more excellent in signal/noise ratio. Such a difference in performance between No. 1n and No. 6n having approximately equal film thicknesses, may be considered to result from a smaller amount of defects such as pinholes in No. 1n. Similarly, when No. 2n–No. 5n (where a B-layer and a light-absorbing layer consist of monomolecular layer built-up films) are compared with No. 7n, it can be observed that No. 2n–No. 5n are more excellent in signal/noise ratio than No. 7n.

EXAMPLE 1p (1) Method for forming B-layer:

A disc substrate of glass of 10 mm in thickness and 180 mm in a diameter was thoroughly cleaned. Subsequently, 7 parts of phenolphthalain which is a phenolic compound, 1 part of polyvinyl alcohol as a binder and 40 parts of water were mixed, followed further by milling by a ball mill for several hours. The resultant mixture was applied by rotary coating on the substrate to prepare respective samples having deposited films made of the phenolphthalain dispersion in binder formed (film thickness 1 $\mu$) thereon.

(2) Method for forming light-absorbing layer:

On the B-layers formed on the glass substrates of respective samples obtained in the above (1). monomolecular layer built-up films of a vanadium phthalocyanine derivative which is a light-absorbing material were formed according to the method as described below.

That is, 7 parts of vanadium phthalocyanine, 1 part of polyvinyl alcohol as the binder and 40 parts of water were mixed, followed further by milling by a ball mill for several hours. The resultant mixture was applied by rotary coating on the B-layer on the substrate to obtain deposited films made of the vanadium phthalocyanine dispersion in binder formed (film thickness 0.015 $\mu$) thereon.

(3) Method for forming A-layer:

On the light-absorbing layers on the glass substrates of respective samples obtained in the above (2), monomolecular layer built-up films of a Crystal Violet lactone derivative which is a leuco derivative of dye were formed.

The monomolecular layer built-up films of said Crystal Violet lactone derivative were formed according to the method as described below.

After the substrate having the B-layer and the light-absorbing layer formed thereon was immersed in an acidic solution of pH 4 and was held vertical to the water surface, a Crystal Violet lactone derivative solution at a concentration of $2 \times 10^{-3}$ mol/liter in chloroform was added dropwise to spread a monomolecular film on the water surface. With the surface pressure set at 30 dyne/cm, the substrate was moved upward and downward at a speed of 2 cm/min. to form respective samples of monomolecular layer built-up films (Y-type films) having the respective layers built up as shown in Table 2p.

(4) Performance tests:

The optical recording devices of the present invention thus prepared according to the methods as described above and the optical discs having constitutions similar to those of the prior arts (the discs were constituted of neither of the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6-9 mW
Recording frequency: 5 MHz
Rotational number of optical disc: 1,800 rpm Reading under the above conditions was performed at a laser output of 1 mW to determine the signal/noise ratio. The results are shown in Table 2p.

TABLE 2p

| Layer constitution | Sample No. | | | | | | |
|---|---|---|---|---|---|---|---|
| | 1p | 2p | 3p | 4p | 5p | 6p# | 7p# |
| A-layer (layer number) | 1 | 27 | 50 | 200 | 400 | 0.005 (μ) | 1 (μ) |
| Light-absorbing layer (μ) | 0.015 | 0.015 | 0.015 | 0.015 | 0.015 | 0.015 (μ) | 0.015 (μ) |
| B-layer (μ) | 1 | 1 | 1 | 1 | 1 | 1 (μ) | 1 (μ) |
| Signal/noise ratio (db) | 35 | 61 | 69 | 73 | 66 | 15 | 50 |

Note
represents Comparative example, and formation of respective layers was performed according to the rotary coating method.

From the results in Table 2p, No. 1p (where an A-layer consists of a monomolecular film) as compared with No. 6p is markedly more excellent in signal/noise ratio. Such a difference in performance between No. 1p and No. 6p having approximately equal film thicknesses, may be considered to result from smaller amount of defects such as pinholes in No. 1p. Similarly, when No. 2p-No. 5p (when respective layers consist of monomolecular layer built-up films) are compared with No. 7p, it can be observed that No. 2p-No. 5p are more excellent in signal/noise ratio than No. 7p.

EXAMPLE 1q (1) Method for forming B-layer:

A disc substrate of glass of 10 mm in thickness and 180 mm in a diameter was thoroughly cleaned. Subsequently, 7 parts of phenolphthalein which is a phenolic compound, 1 part of polyvinyl alcohol as a binder and 40 parts of water were mixed, followed further by milling by a ball mill for several hours. The resultant mixture was applied by rotary coating on the substrate to prepare respective samples having deposited films made of the phenolphthalein dispersion in binder formed (film thickness 1 μ) thereon.

(2) Method for forming light-absorbing layer:

On the B-layers formed on the glass substrates of respective samples obtained in the above (1), monomolecular layer built-up films of a vanadium phthalocyanine derivative which is a light-absorbing material were formed by means of the monomolecular layer forming device as described above.

The monomolecular layer built-up film of the vanadium phthalocyanine derivative was formed according to the method as described below.

After the substrate having the B-layer formed thereon was immersed in water and was held vertical to the water surface, a vanadium phthalocyanine derivative solution at a concentration of $2 \times 10^{-3}$ mol/liter in chloroform was added dropwise onto the water surface to spread a monomolecular film on the water surface. With the surface pressure set at 30 dyne/cm, the substrate was moved upward and downward at a speed of 2 cm/min. to form respective samples of monomolecular layer built-up films (Y-type films) having the repsective layers built up as shown in Table 2q.

(3) Method for forming A-layer:

On the light-absorbing layers formed on the glass substrates of the respective samples, deposited films of Crystal Violet lactone which is a leuco derivative of dye were formed according to the method as described below.

That is, 7 parts of Crystal Violet lactone, 1 part of polyvinyl alcohol as the binder and 100 parts of water were mixed, followed further by milling by a ball mill for several hours. The resultant mixture was applied by rotary coating on the light-absorbing layer on the substrate to obtain deposited films made of the Crystal Violet lactone dispersion in binder formed (film thickness 1μ) thereon.

(4) Performance tests:

The optical recording devices of the present invention thus prepared according to the methods as described above and the optical discs having constitutions similar to those of the prior arts (the discs were constituted of neither of the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6-9 mW
Recording frequency: 5 MHz
Rotational number of optical disc: 1,800 rpm Reading under the above conditions was performed at a laser output of 1 mW to determine the signal/noise ratio. The results are shown in Table 2q.

TABLE 2q

| Layer constitution: | Sample No. | | | | | | |
|---|---|---|---|---|---|---|---|
| | 1q | 2q | 3q | 4q | 5q | 6q# | 7q# |
| A-layer (μ) | 1 | 1 | 1 | 1 | 1 | 1 (μ) | 1 (μ) |
| Light-absorbing layer (layer number) | 1 | 2 | 4 | 6 | 8 | 0.005 (μ) | 0.015 (μ) |
| B-layer (μ) | 1 | 1 | 1 | 1 | 1 | 1 (μ) | 1 (μ) |
| Signal/noise ratio (db) | 49 | 62 | 70 | 73 | 65 | 5 | 50 |

Note
represents Comparative example, and formation of respective layers was performed according to the rotary coating method.

From the results in Table 2q, No. 1q (where a light-absorbing layer consists of a monomolecular film) as compared with No. 6q is markedly more excellent in signal/noise ratio. Such difference in performance between No. 1q and No. 6q having approximately equal film thicknesses, may be considered to result from a smaller amount of defects such as pinholes in No. 1q. Similarly, when No. 2q–No. 5q (when respective layers consist of monomolecular layer built-up films) are compared with No. 7q, it can be observed that No. 2q–No. 5q are more excellent in signal/noise ratio than No. 7q.

EXAMPLE 1r (1) Method for forming B-layer:

A disc substrate of glass of 10 mm in thickness and 180 mm in diameter was thoroughly cleaned. Subsequently, by means of the monomolecular layer forming device as described above, a monomolecular layer built-up layer of phenolphthalein derivative which is phenolic compound.

The monomolecular layer built-up film of said phenolphthalein derivative was formed according to the method as described below.

After the substrate was immersed in water and was held vertical to the water surface, a phenolphthalein derivative solution at a concentration of $2 \times 10^{-3}$ mol/liter in chloroform was added dropwise to spread a monomolecular film on the water surface. With the surface pressure set at 30 dyne/cm. the substrate was moved upward and downward at a speed of 2 cm/min. to prepare a monomolecular layer built-up film (Y-type film) built up in 27 layers.

Similarly, respective samples of monomolecular layer built-up films of one layer, 50 layers, 200 layers and 400 layers were obtained.

(2) Method for forming light-absorbing layer:

Next, on the B-layers formed on the glass substrates of respective samples obtained in the above (1), monomolecular layer built-up films of a vanadium phthalocyanine derivative which is a light-absorbing material were formed according to the method as described below.

That is, 7 parts of vanadium phthalocyanine, 1 part of polyvinyl alcohol as the binder and 40 parts of water were mixed, followed further by milling by a ball mill for several hours. The resultant mixture was applied by rotary coating on the B-layer on the substrate to obtain deposited films made of the vanadium phthalocyanine dispersion (film thickness 0.015 $\mu$).

(3) Method for forming A-layer:

On the light-absorbing layers formed on the glass substrates of the respective samples, deposited films of Crystal Violet lactone which is a leuco derivative of dye were formed according to the method as described below.

That is, 7 parts of Crystal Violet lactone, 1 part of polyvinyl alcohol as a binder and 100 parts of water were mixed, followed further by milling by a ball mill for several hours. The resultant mixture was applied by rotary coating on the light-absorbing layer on the substrate to obtain deposited films made of the Crystal Violet lactone dispersion in a binder formed (film thickness 1 $\mu$) thereon.

(4) Performance tests:

The optical recording devices of the present invention thus prepared according to the methods as described above and the optical discs having constitutions similar to those of the prior art (the discs were constituted of neither of the monomolecular films nor the built-up films thereof) as Comparative examples were used for recording by the information memorizing device as shown in FIG. 5 under the conditions as shown below. Reading reproduction was performed for comparison of the performances of the both recording devices.

(Recording conditions)

Semiconductor laser wavelength: 830 nm
Laser output: 6–9 mW
Recording frequency: 5 MHz
Rotational number of optical disc: 1,800 rpm Reading under the above conditions was performed at a laser output of 1 mW to determine the signal/noise ratio. The results are shown in Table 2r.

TABLE 2r

| Layer constitution: | Sample No. | | | | | | |
|---|---|---|---|---|---|---|---|
| | 1r | 2r | 3r | 4r | 5r | 6r# | 7r# |
| A-layer ($\mu$) | 1 | 1 | 1 | 1 | 1 | 1 ($\mu$) | 1 ($\mu$) |
| Light-absorbing layer ($\mu$) | 0.015 | 0.015 | 0.015 | 0.015 | 0.015 | 0.015 ($\mu$) | 0.015 ($\mu$) |
| B-layer (layer number) | 1 | 27 | 50 | 200 | 400 | 1 ($\mu$) | 1 ($\mu$) |
| Signal/noise ratio (db) | 35 | 63 | 69 | 72 | 69 | 5 | 50 |

Note
represents Comparative example, and formation of respective layers was performed according to the rotary coating method.

From the results in Table 2r, No. 1r (when a B-layer consists of a monomolecular film) as compared with No. 6r is markedly more excellent in signal/noise ratio. Such a difference in performance between No. 1r and No. 6r having approximately equal film thicknesses, may be considered to result from smaller amount of defects such as pinholes in No. 1r. Similarly, when No. 2r–No. 5r (when respective layers consist of monomolecular layer built-up films) are compared with No. 7r, it can be observed that No. 2r–No. 5r are more excellent in signal/noise ratio than No. 7r.

What is claimed is:

1. An optical recording device, which comprises:
   a laminated member comprising an A-layer containing a chromogenic compound which is colorless or pale colored, a light-absorbing layer, a B-layer containing an assistant compound capable of making said chromogenic compound form color through contact with said chromogenic compound; and
   a substrate;
   wherein at least a middle layer of said three layers is constituted of monomolecular film or a built-up film thereof formed according to the Langmuir-Blodgett method.

2. An optical recording device according to claim 1, which comprises an A-layer comprising a chromogenic compound which is colorless or pale colored, a light-absorbing layer, a B-layer comprising an assistant compound capable of making said chromogenic compound form color through contact with said chromogenic compound, said three layers being laminated in this order and a substrate wherein at least the light absorbing layer of said three layers being constituted of a monomolecular film or a built-up film thereof formed according to the Langmuir-Blodgett method.

3. An optical recording device according to claim 2, wherein said chromogenic compound is a leuco derivative of a dye.

4. An optical recording device according to claim 2, wherein said chromogenic compound is selected from triphenylmethane type, fluorane type, phenothiazine type, auramine type and spiropyrane type compounds.

5. An optical recording device according to claim 2, wherein said assistant compound is selected from aromatic sulfonic acid compounds, aromatic carboxylic acids and higher aliphatic carboxylic acid.

6. An optical recording device according to claim 2, wherein said assistant compound is a phenolic compound.

7. An optical recording device according to claim 6, wherein said phenolic compound is selected from among p-t-butylphenol, α-naphthol, β-naphthol, phenolphthalein bisphenol-A, p-phenoxyphenol. 4-hydroxyacetophenone, 3,5-xylenol, thymol, hydroquinone, methyl-4-hydroxybenzoate, catechol, resorcinol, 4-t-octylcatechol, 4,4'-sec-butylidenediphenol, 2,2'-dihydroxydiphenyl, 2,2'-methylenebis(4-methyl-6-t-butylphenol), 2,2'-bis(4-oxyphenyl)propane, 4,4'-isopropylidene-bis(2-t-butylphenol), pyrogallol, phloroglucinol and phloroglucinol carboxylic acid.

8. An optical recording device according to claim 2, wherein said light-absorbing layer comprises a meltable light-absorbing dye or a sublimable light-absorbing dye.

9. An optical recording device according to claim 2, wherein said light-absorbing layer is selected from among metal phthalocyanines and derivatives thereof, xanthene type dyes, metal-containing azo dyes and acidic azo dyes.

10. An optical recording device according to claim 2, wherein said A-layer and B-layer have a thickness ranging from 200 Å to 10 μm.

11. An optical recording device according to claim 2, wherein said light-absorbing layer has a thickness ranging from 30 Å to 1000 Å.

12. An optical recording device according to claim 1, which comprises a light-absorbing layer, an A-layer comprising a chromogenic compound which is colorless or pale colored, a B-layer comprising an assistant compound capable of making said chromogenic compound form color through contact with said chromogenic compound, said three layers being laminated in this order and a substrate wherein at least one of said three layers being constituted of a monomolecular film or a built-up film thereof formed according to the Langmuir-Blodgett method, and the reactive sites of the assistant compound and of the chromogenic compound being separated from each other through the non-reactive sites thereof.

13. An optical recording device according to claim 12, wherein said chromogenic compound is a leuco derivative of a dye.

14. An optical recording device according to claim 12, wherein said chromogenic compound is selected from triphenylmethane type, fluorane type, phenothiazine type, auramine type and spiropyrane type compounds.

15. An optical recording device according to claim 12, wherein said assistant compound is selected from aromatic sulfonic acid compounds, aromatic carboxylic acids and higher aliphatic carboxylic acids.

16. An optical recording device according to claim 12, wherein said assistant compound is a phenolic compound.

17. An optical recording device according to claim 16, wherein said phenolic compound is selected from among p-t-butylphenol, α-naphthol, β-naphthol, phenolphthalein, bisphenol-A, p-phenoxyphenol, 4-hydroxyacetophenone, 3,5-xylenol, thymol, hydroquinone, methyl 4-hydroxybenzoate, catechol, resorcinol, 4-t-octylcatechol. 4,4'-sec-butylidenediphenol, 2,2'-dihydroxydiphenyl, 2,2'-methylenebis(4-methyl-6-t-butylphenol), 2,2'-bis(4-oxyphenyl)propane, 4,4'-isopropylidene-bis-(2-t-butylphenol), pyrogallol, phloroglucinol and phloroglucinol carboxylic acid.

18. An optical recording device according to claim 12, wherein said light-absorbing layer comprises a meltable light-absorbing dye or a sublimable light-absorbing dye.

19. An optical recording device according to claim 12, wherein said light-absorbing layer is selected from among metal phthalocyanines and derivatives thereof, xanthene type dyes, metal-containing azo dyes and acidic azo dyes.

20. An optical recording device according to claim 12, wherein said A-layer and B-layer have a thickness ranging from 200 Å to 10 μm.

21. An optical recording device according to claim 12, wherein said light-absorbing layer has a thickness ranging from 30 Å to 1000 Å.

22. An optical recording device according to claim 1 which comprises an A-layer comprising a chromogenic compound which is colorless or pale colored; a B-layer comprising an assistant compound capable of making said chromogenic compound form color through contact with said chromogenic compound; a light-absorbing layer, said three layers being laminated in this order; and a substrate, wherein at least the A-layer and the B-layer of said three layers being constituted of a monomolecular film or a built-up film thereof formed according to the Langmuir-Blodgett method, and the reactive sites of the assistant compound and the chromogenic compound being separated from each other through the non-reactive sites thereof.

23. An optical recording device according to claim 22, wherein said chromogenic compound is a leuco derivative of a dye.

24. An optical recording device according to claim 22, wherein said chromogenic compound is selected from triphenylmethane type, fluorane type, phenothiazine type, auramine type and spiropyrane type compounds.

25. An optical recording device according to claim 22, wherein said assistant compound is selected from aromatic sulfonic acid compounds, aromatic carboxylic acids and higher fatty carboxylic acids.

26. An optical recording device according to claim 22, wherein said assistant compound is a phenolic compound.

27. An optical recording device according to claim 26, wherein said phenolic compound is selected from among p-t-butylphenol, α-naphthol, β-naphthol, phenolphthalein, bisphenol-A, p-phenoxyphenol, 4-hydroxyacetophenone, 3,5-xylenol, thymol, hydroquinone, methyl 4-hydroxybenzoate, catechol, resorcinol, 4-t-octylcatechol, 4,4'-sec-butylidenediphenol, 2,2'-dihydroxydiphenyl, 2,2'-methylenebis(4-methyl-6-t-butylphenol), 2,2'-bis(4-oxyphenyl)propane, 4,4'-isopropylidene-bis(2-t-butylphenol), pyrogallol, phloroglucinol and phloroglucinol carboxylic acid.

28. An optical recording device according to claim 22, wherein said light-absorbing layer comprises a meltable light-absorbing dye or a sublimable light-absorbing dye.

29. An optical recording device according to claim 22, wherein said light-absorbing layer is selected from among metal phthalocyanines and derivatives thereof, xanthene type dyes, metal-containing azo dyes and acidic azo dyes.

30. An optical recording device according to claim 22, wherein said A-layer and B-layer have a thickness ranging from 200 Å to 10 μm.

31. An optical recording device according to claim 22, wherein said light-absorbing layer has a thickness ranging from 30 Å to 1000 Å.

* * * * *

UNITED STATES PATENT AND TRADEMARK OFFICE
CERTIFICATE OF CORRECTION

PATENT NO. : 4,933,221

DATED : June 12, 1990

INVENTOR(S) : YUKUO NISHIMURA, ET AL.

It is certified that error appears in the above-identified patent and that said Letters Patent is hereby corrected as shown below:

On the title page:

<u>IN [56] REFERENCES CITED</u>

U.S. PATENT DOCUMENTS, "Miyazcki et al." should read --Miyazaki et al.--.

<u>COLUMN 1</u>

Line 20, "memoried)" should read --memorized)--.
    Line 24, "literatures" should read --literature--.
    Line 34, "form" should read --to form--.

<u>COLUMN 2</u>

Line 67, "the" (first occurrence) should be deleted.

<u>COLUMN 6</u>

Line 51, "called" should read --said--.

<u>COLUMN 7</u>

Line 55, "as" should be deleted.

<u>COLUMN 9</u>

Line 11, "with each other to proceed a reaction" should read --and react with each other--.
    Line 28, "about" should be deleted.

UNITED STATES PATENT AND TRADEMARK OFFICE
CERTIFICATE OF CORRECTION

PATENT NO. : 4,933,221

DATED : June 12, 1990

INVENTOR(S) : YUKUO NISHIMURA, ET AL.

It is certified that error appears in the above-identified patent and that said Letters Patent is hereby corrected as shown below:

COLUMN 13

Lines 67-68, "compound." should read --compound is formed--.

COLUMN 14

Line 63, "not" should read --nor--.

COLUMN 15

Line 25, "Table 2" should read --Table 2a--.

COLUMN 17

Lines 10-11, "compound." should read --compound is formed.--.

COLUMN 19

Line 13, "dyen/cm," should read --dyne/cm,--.

COLUMN 21

Line 33, "substance." should read --substance is formed--.

UNITED STATES PATENT AND TRADEMARK OFFICE
CERTIFICATE OF CORRECTION

PATENT NO. : 4,933,221

DATED : June 12, 1990

INVENTOR(S) : YUKUO NISHIMURA, ET AL.

Page 3 of 5

It is certified that error appears in the above-identified patent and that said Letters Patent is hereby corrected as shown below:

COLUMN 25

Line 17, "which" should read --which is--.
    Line 18, "substance." should read --substance is formed.--.

COLUMN 27

Line 33, "arachidinic" should read --arachidic--.

COLUMN 28

Line 42, "which" should read --which is--.
    Line 43, "substance." should read --substance is formed.--.

COLUMN 30

Line 3, "compound." should read --compound is formed.--.
    Line 7, "wafer" should read --water--.
    Line 8, "wafer" should read --water--.
    Line 11, "wafer" should read --water--.
    Line 30, "wafer" should read --water--.
    Line 33, "wafer" should read --water--.
    Line 53, "wafer" should read --water--.
    Line 56, "wafer" should read --water--.

UNITED STATES PATENT AND TRADEMARK OFFICE
CERTIFICATE OF CORRECTION

PATENT NO. : 4,933,221

DATED : June 12, 1990

INVENTOR(S) : YUKUO NISHIMURA, ET AL.

It is certified that error appears in the above-identified patent and that said Letters Patent is hereby corrected as shown below:

COLUMN 31

Line 28, "Table 2k." should read --Table 2k,--.
Line 63, "wafer" should read --water--.
Line 66, "wafer" should read --water--.
Line 67, "wafer" should read --water--.

COLUMN 32

Line 20, "wafer" should read --water--.
Line 44, "800 rpm" should read --1,800 rpm--.

COLUMN 33

Line 19, "wafer" should read --water--.
Line 23, "wafer" should read --water--.
Line 33, "a" should be deleted.
Line 54, "violet" should read --Violet--.
Line 65, "(Y type" should read --(Y-type--.

COLUMN 34

Line 60, "wafer" should read --water--.
Line 64, "wafer" should read --water--.
Line 65, "sot" should read --set--.

COLUMN 35

Line 5, "B layers" should read --B-layers--.
Line 15, "wafer" should read --water--.
Line 18, "wafer" should read --water--.
Line 19, "wafer" should read --water--.

UNITED STATES PATENT AND TRADEMARK OFFICE
CERTIFICATE OF CORRECTION

PATENT NO. : 4,933,221
DATED : June 12, 1990
INVENTOR(S) : YUKUO NISHIMURA, ET AL.

It is certified that error appears in the above-identified patent and that said Letters Patent is hereby corrected as shown below:

COLUMN 36

Line 28, "phenolphthalain" should read --phenolphthalein--.
    Line 34, "phenolphthalain" should read --phenolphthalein--.
    Line 38, "(1)." should read --(1),--.

COLUMN 42

Line 1, "methyl 4-hydroxybenzoatc" should read --methyl 4-hydroxybenzoate--.

Signed and Sealed this

Twelfth Day of May, 1992

Attest:

DOUGLAS B. COMER

Attesting Officer      Acting Commissioner of Patents and Trademarks